(12) United States Patent
Nakagawa et al.

(10) Patent No.: US 12,068,004 B2
(45) Date of Patent: Aug. 20, 2024

(54) MAGNETIC RECORDING DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Yuji Nakagawa, Kawasaki Kanagawa (JP); Naoyuki Narita, Funabashi Chiba (JP); Masayuki Takagishi, Kunitachi Tokyo (JP); Tomoyuki Maeda, Kawasaki Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 18/358,850

(22) Filed: Jul. 25, 2023

(65) Prior Publication Data

US 2024/0194223 A1 Jun. 13, 2024

(30) Foreign Application Priority Data

Dec. 9, 2022 (JP) .................. 2022-197338

(51) Int. Cl.
*G11B 5/54* (2006.01)
*G11B 5/09* (2006.01)
(Continued)

(52) U.S. Cl.
CPC .......... *G11B 20/10009* (2013.01); *G11B 5/09* (2013.01); *G11B 20/24* (2013.01)

(58) Field of Classification Search
CPC ............... G11B 5/3166; G11B 5/314; G11B 2005/0021; G11B 2005/0024;
(Continued)

(56) References Cited

U.S. PATENT DOCUMENTS 7,616,412 B2 11/2009 Zhu et al.
8,982,502 B2 * 3/2015 Morinaga ............ G11B 5/3133
360/71
(Continued)

FOREIGN PATENT DOCUMENTS

JP 2008-277586 A 11/2008
JP 2009-064499 A 3/2009
(Continued)

OTHER PUBLICATIONS

X. Bai and J. - G. Zhu, "Effective Field Analysis of Segmented Media for Microwave-Assisted Magnetic Recording", in IEEE Magnetics Letters, vol. 8, pp. 1-4, 2017.
(Continued)

*Primary Examiner* — Nabil Z Hindi
(74) *Attorney, Agent, or Firm* — Knobbe Martens Olson & Bear LLP

(57) ABSTRACT

According to one embodiment, a magnetic recording device includes a magnetic head and a controller. The magnetic head includes first and second magnetic poles, a magnetic element provided between the first and second magnetic poles, and first and second terminals. The controller is configured to perform a recording operation. In the recording operation, the controller is configured to supply a recording current to the coil while applying an element voltage not less than a first voltage and not more than a second voltage between the first terminal and the second terminal. A differential resistance of the magnetic element when a positive applied voltage applied between the first terminal and the second terminal is changed while the recording current is supplied to the coil becomes a first peak when the applied voltage is the first voltage.

20 Claims, 14 Drawing Sheets

(51) Int. Cl.
 *G11B 20/10* (2006.01)
 *G11B 20/24* (2006.01)

(58) Field of Classification Search
 CPC ........... G11B 5/012; G11B 17/34; G11B 5/09; G11B 5/59627; G11B 5/3503; G11B 5/3146; G11B 5/1278; G11B 5/3133; G11B 5/54
 USPC .......................................................... 360/59
 See application file for complete search history.

(56) References Cited

U.S. PATENT DOCUMENTS

| | | | |
|---|---|---|---|
| 9,007,721 | B2 | 4/2015 | Sato |
| 9,064,508 | B1 | 6/2015 | Shiimoto et al. |
| 9,117,474 | B1 | 8/2015 | Contreras et al. |
| 10,522,174 | B1 | 12/2019 | Chen |
| 10,937,450 | B1 | 3/2021 | Kawasaki et al. |
| 11,393,493 | B1 | 7/2022 | Nakagawa |
| 11,398,244 | B2 | 7/2022 | Takagishi |
| 11,568,891 | B1 | 1/2023 | Chen |
| 2008/0268291 | A1 | 10/2008 | Akiyama et al. |
| 2009/0052095 | A1 | 2/2009 | Yamada et al. |
| 2009/0059417 | A1 | 3/2009 | Takeo et al. |
| 2012/0164487 | A1 | 6/2012 | Childress |
| 2012/0176702 | A1 | 7/2012 | Yamada et al. |
| 2019/0088275 | A1 | 3/2019 | Narita et al. |
| 2020/0294537 | A1 | 9/2020 | Nagawawa |
| 2021/0142821 | A1 | 5/2021 | Iwasaki |
| 2022/0005497 | A1 | 1/2022 | Takagishi |
| 2022/0084551 | A1 | 3/2022 | Koizumi |
| 2022/0157335 | A1 | 5/2022 | Iwasaki |
| 2022/0270640 | A1 | 8/2022 | Nakagawa |
| 2022/0270641 | A1 | 8/2022 | Nakagawa |
| 2023/0031273 | A1 | 2/2023 | Nakagawa |
| 2023/0046928 | A1 | 2/2023 | Nakagawa |
| 2023/0178102 | A1 | 6/2023 | Nakagawa |

FOREIGN PATENT DOCUMENTS

| | | |
|---|---|---|
| JP | 4358279 B2 | 11/2009 |
| JP | 2012-146351 A | 8/2012 |
| JP | 2019-057338 A | 4/2019 |
| JP | 2022-012263 A | 1/2022 |
| JP | 2022-050037 A | 3/2022 |
| JP | 2022-129730 A | 9/2022 |
| JP | 2023-083663 A | 6/2023 |

OTHER PUBLICATIONS

T. Tanaka, et al., "MAMR writability and signal-recording characteristics on granular exchange-coupled composite media" in Journal of Magnetism and Magnetic Materials 529 (2021).

* cited by examiner

MAGNETIC RECORDING DEVICE

CROSS-REFERENCE TO RELATED APPLICATIONS

This application is based upon and claims the benefit of priority from Japanese Patent Application No. 2022-197338, filed on Dec. 9, 2022; the entire contents of which are incorporated herein by reference.

FIELD

Embodiments described herein relate generally to a magnetic recording device.

BACKGROUND

Information is recorded on a magnetic recording medium such as an HDD (Hard Disk Drive) using a magnetic head. It is desired to improve recording density in the magnetic recording device.

DETAILED DESCRIPTION

Figure 1:
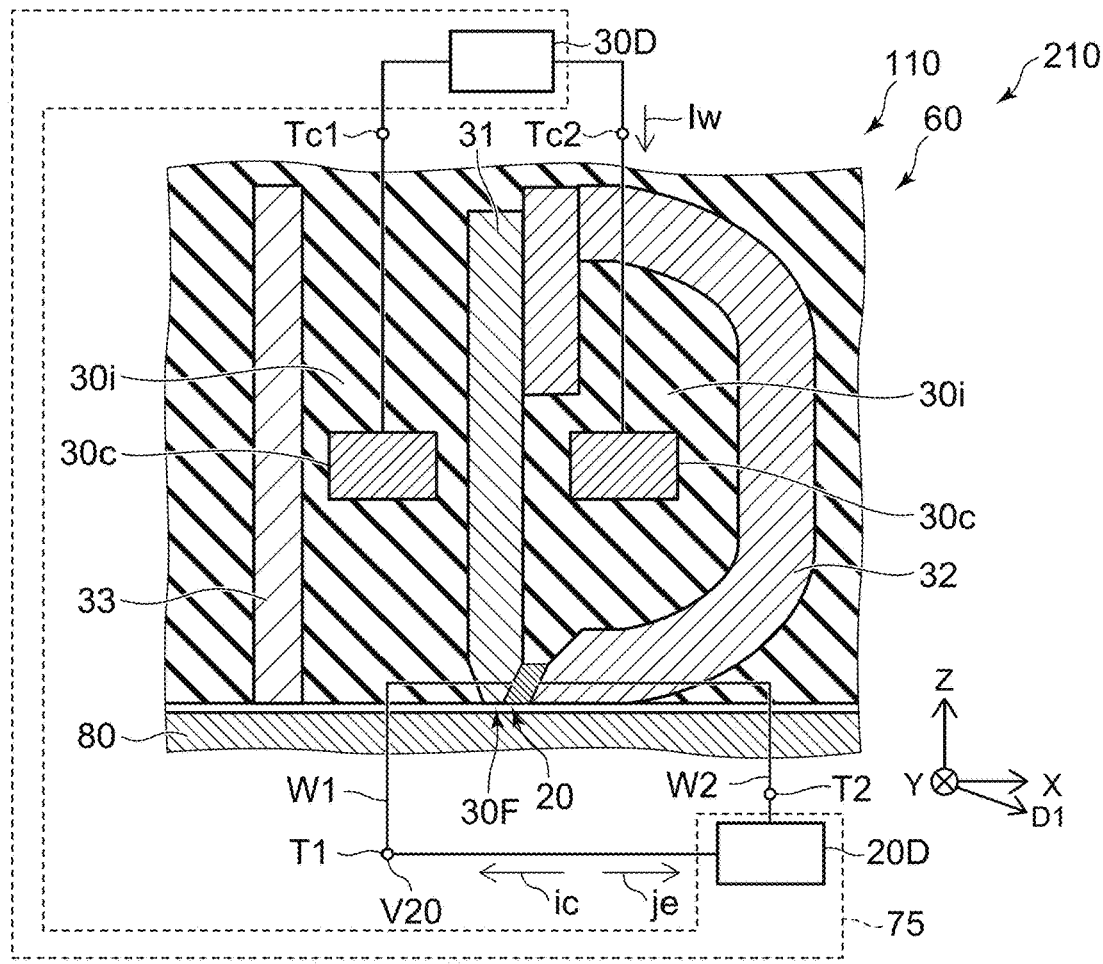
FIG. 1 is a schematic cross-sectional view illustrating a magnetic recording device according to a first embodiment.

According to one embodiment, a magnetic recording device includes a magnetic head and a controller. The magnetic head includes a first magnetic pole, a second magnetic pole, a magnetic element provided between the first magnetic pole and the second magnetic pole, a first terminal electrically connected to the first magnetic pole, a second terminal electrically connected to the second magnetic pole, and a coil. The controller is electrically connected to the first terminal, the second terminal, and the coil. An end of the magnetic element is electrically connected to the first magnetic pole. Another end of the magnetic element is electrically connected to the second magnetic pole. The controller is configured to perform a recording operation. In the recording operation, the controller is configured to supply a recording current to the coil while applying an element voltage not less than a first voltage and not more than a second voltage between the first terminal and the second terminal. When the element voltage, the first voltage and the second voltage are applied, a second potential of the second magnetic pole is lower than a first potential of the first magnetic pole. A differential resistance of the magnetic element when a positive applied voltage applied between the first terminal and the second terminal is changed while the recording current is supplied to the coil becomes a first peak when the applied voltage is the first voltage. When the positive applied voltage is applied, the second potential is lower than the first potential. When a first applied voltage is applied between the first terminal and the second terminal while the recording current is supplied to the coil, a first signal is generated between the first terminal and the second terminal. The first signal has a first intensity when the first applied voltage is a first value of positive. The first signal has a second intensity when the first applied voltage is a second value of negative. A ratio of an absolute value of a difference between the first intensity and the second intensity to a normalized change rate is not less than 1 at the second voltage. An absolute value of the second value is same as the first value. When the first applied voltage is positive, the second potential is lower than the first potential. When the first applied voltage is negative, the second potential is higher than the first potential. The normalized change rate is a product of the first voltage and an absolute value of the change rate of the second intensity with respect to the first applied voltage when the first applied voltage is negative.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

FIG. 1 is a schematic cross-sectional view illustrating a magnetic recording device according to a first embodiment.

As shown in FIG. 1, a magnetic recording device 210 according to the embodiment includes a magnetic head 110 and a controller 75. The magnetic recording device 210 may include a magnetic recording medium 80. At least a recording operation is performed in the magnetic recording device 210. In the recording operation, information is recorded on the magnetic recording medium 80 using the magnetic head 110.

The magnetic head 110 includes a recording section 60. As will be described below, the magnetic head 110 may include a reproducing section. The recording section 60 includes a first magnetic pole 31, a second magnetic pole 32, a magnetic element 20 and a coil 30c. The magnetic element 20 is provided between the first magnetic pole 31 and the second magnetic pole 32.

For example, the first magnetic pole 31 and the second magnetic pole 32 form a magnetic circuit. The first magnetic pole 31 is, for example, a main magnetic pole. The second magnetic pole 32 is, for example, a trailing shield. The first magnetic pole 31 may be the trailing shield and the second magnetic pole 32 may be the main pole.

A direction from the magnetic recording medium 80 to the magnetic head 110 is defined as a Z-axis direction. One direction perpendicular to the Z-axis direction is defined as an X-axis direction. A direction perpendicular to the Z-axis direction and the X-axis direction is defined as a Y-axis direction. The Z-axis direction corresponds to, for example, the height direction. The X-axis direction corresponds to, for example, a down-tack direction. The Y-axis direction corresponds to, for example, a cross-track direction. The magnetic recording medium 80 and the magnetic head 110 move relatively along the down-track direction. A recording magnetic field generated by the magnetic head 110 is applied to a desired position on the magnetic recording medium 80. The magnetization at the desired position of the magnetic recording medium 80 is controlled in a direction according to the recording magnetic field. Information is thus recorded on the magnetic recording medium 80.

A direction from the first magnetic pole 31 to the second magnetic pole 32 is defined as a first direction D1. The first direction D1 is substantially along the X-axis direction. In the embodiments, the first direction D1 may be inclined with respect to the X-axis direction. The angle of the inclination is, for example, not less than 0 degrees and not more than 10 degrees.

In this example, a portion of the coil 30c is located between first magnetic pole 31 and second magnetic pole 32. In this example, a shield 33 is provided. The first magnetic pole 31 is provided between the shield 33 and the second magnetic pole 32 in the X-axis direction. Another portion of the coil 30 c is provided between shield 33 and the first magnetic pole 31. An insulating portion 30i is provided between these multiple elements. The shield 33 is, for example, a leading shield. The magnetic head 110 may also include side shields (not shown).

As shown in FIG. 1, a recording current Iw is supplied from the recording circuit 30D to the coil 30c. For example, a first coil terminal Tc1 and a second coil terminal Tc2 are provided in the coil 30c. The recording current Iw is supplied to the coil 30c through these coil terminals. The recording magnetic field corresponding to the recording current Iw is applied to the magnetic recording medium 80 from the first magnetic pole 31.

As shown in FIG. 1, the first magnetic pole 31 includes a medium facing face 30F. The medium facing face 30F is, for example, an ABS (Air Bearing Surface). The medium facing face 30F faces the magnetic recording medium 80, for example. The medium facing face 30F extends, for example, along the X-Y plane.

As shown in FIG. 1, an element circuit 20D is electrically connected to the magnetic element 20. In this example, the magnetic element 20 is electrically connected to the first magnetic pole 31 and the second magnetic pole 32. In the magnetic head 110, a first terminal T1 and a second terminal T2 are provided. The first terminal T1 is electrically connected to one end of the magnetic element 20 via the first wiring W1 and the first magnetic pole 31. The second terminal T2 is electrically connected to the other end of the magnetic element 20 via the second wiring W2 and the second magnetic pole 32. For example, an element current ic is supplied to the magnetic element 20 from the element circuit 20D.

As shown in FIG. 1, the element current ic has an orientation from the first magnetic pole 31 to the second magnetic pole 32. As shown in FIG. 1, the electron flow je associated with the element current ic has an orientation from the second magnetic pole 32 to the first magnetic pole 31. The element current ic is direct current, for example.

For example, by the element current ic equal to or higher than a threshold flowing through the magnetic element 20, oscillation occurs in the magnetic layer included in the magnetic element 20. The magnetic element 20 functions, for example, as an STO (Spin-Torque Oscillator). An alternating magnetic field (for example, a high-frequency magnetic field) is generated from the magnetic element 20 along with the oscillation. The alternating magnetic field generated by the magnetic element 20 is applied to the magnetic recording medium 80 to assist recording on the magnetic recording medium 80. For example, MAMR (Microwave Assisted Magnetic Recording) can be performed.

The recording circuit 30D and the element circuit 20D are included in the controller 75. The controller 75 is electrically connected to the magnetic element 20 and the coil 30c. The controller 75 is electrically connected to the first terminal T1, the second terminal T2 and the coil 30c. The controller 75 is configured to supply the recording current Iw to the coil 30 c and to supply the element current ic to the magnetic element 20.

For example, the controller 75 (element circuit 20D) applies an element voltage V20 corresponding to the element current ic between the first terminal T1 and the second terminal T2. Practically, the device current ic may be controlled by controlling the element voltage V20. The element voltage V20 corresponds to, for example, the potential of the first terminal T1 based on the potential of the second terminal T2. The wiring resistance between these terminals and the magnetic element 20 is substantially constant. A voltage of a difference between the element voltage V20 and the voltage drop in the wiring is applied to the magnetic element 20. A change in the voltage applied to the magnetic element 20 corresponds to a change in the element voltage V20. For example, in a case for considering the characteristics of the magnetic element 20 based on the applied voltage, it may be considered that the voltage (element voltage V20) applied between the first terminal T1 and the second terminal T2 is substantially applied to the magnetic element 20. For example, the rate of change in element voltage V20 is substantially the same as the rate of change in the voltage applied to magnetic element 20.

As described above, in the recording operation, the controller 75 supplies the recording current Iw to the coil 30c while applying the element voltage V20 between the first terminal T1 and the second terminal T2. The element voltage V20 is not less than a first voltage V1 and not more than a second voltage V2, which will be described below.

The element voltage V 20 is positive. When the element voltage V 20, the first voltage V1 and the second voltage V2 are applied, a second potential (potential of the second terminal T2) of the second magnetic pole 32 is lower than a first potential (potential of the first terminal T1) of the first magnetic pole 31.

An example of the magnetic head 110 will be described below.

Figure 2:
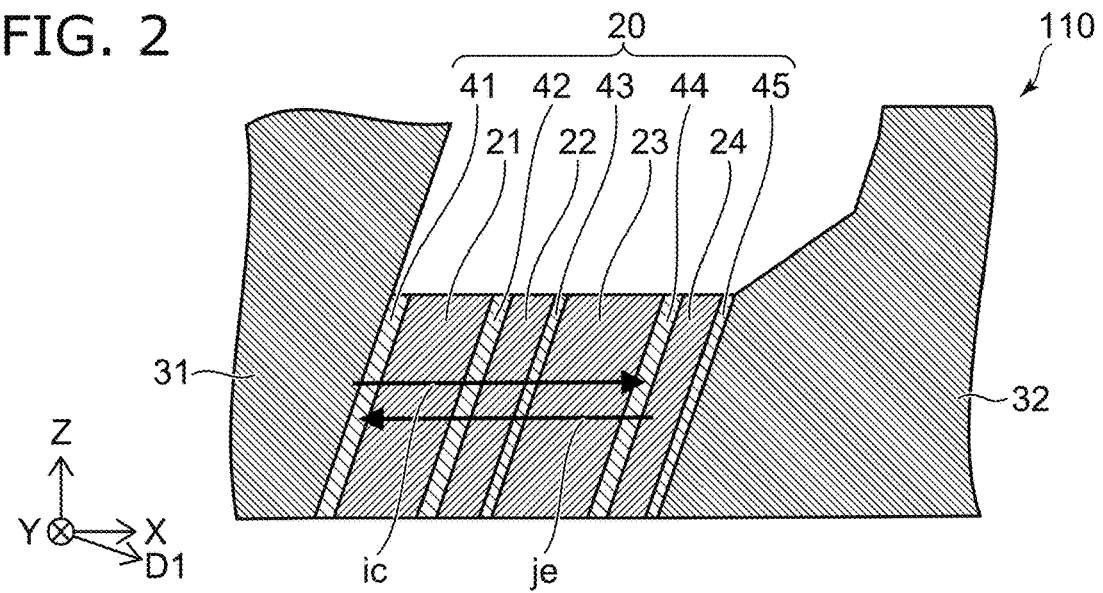
FIG. 2 is a schematic cross-sectional view illustrating a part of the magnetic recording device according to the first embodiment.

FIG. 2 is a schematic cross-sectional view illustrating a part of the magnetic recording device according to the first embodiment.

Figure 3:
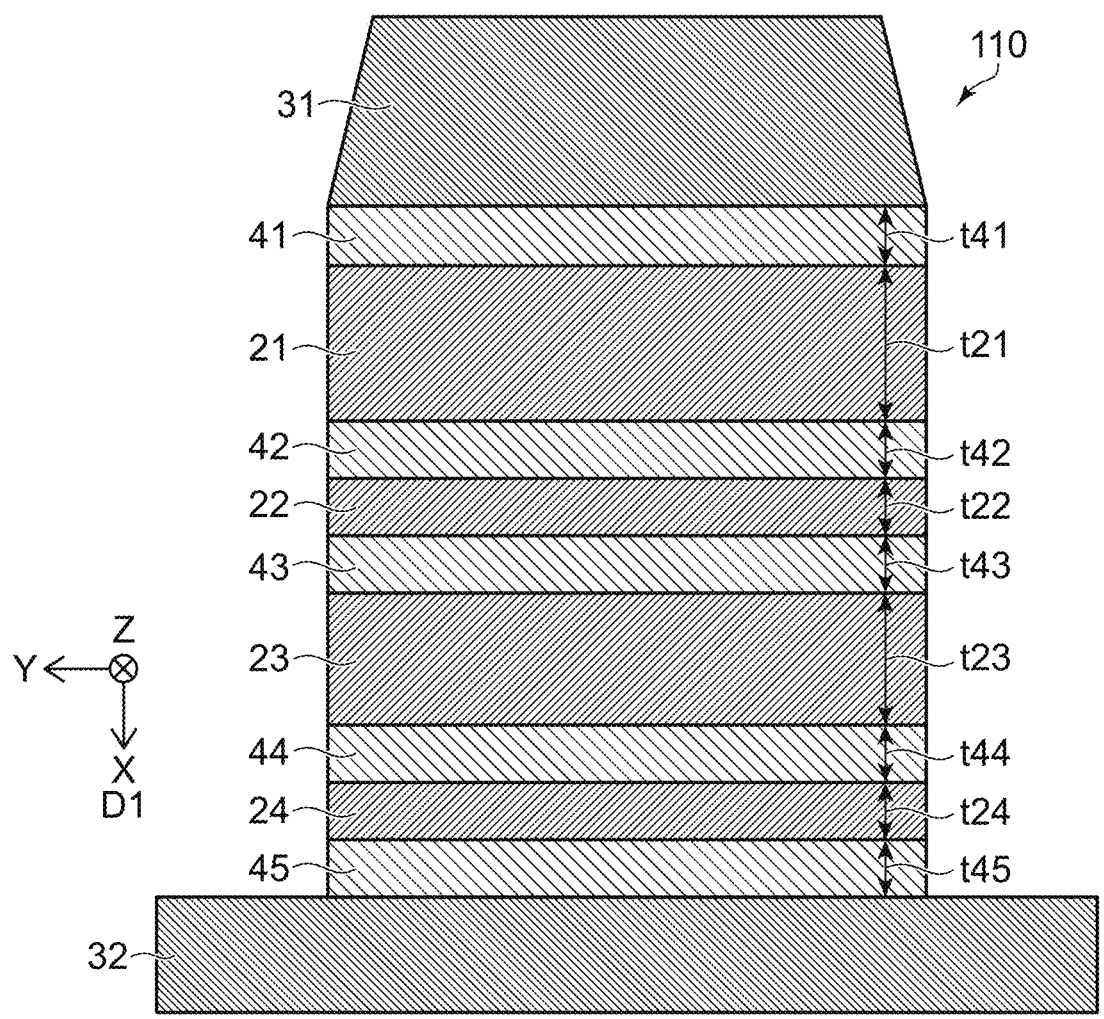
FIG. 3 is a schematic plan view illustrating the part of the magnetic recording device according to the first embodiment.

FIG. 3 is a schematic plan view illustrating the part of the magnetic recording device according to the first embodiment.

As shown in FIGS. 2 and 3, the magnetic element 20 includes a first magnetic layer 21, a second magnetic layer 22, a third magnetic layer 23, and a fourth magnetic layer. The first magnetic layer 21 is provided between the first magnetic pole 31 and the second magnetic pole 32. The second magnetic layer 22 is provided between the first magnetic layer 21 and the second magnetic pole 32. The third magnetic layer 23 is provided between the second magnetic layer 22 and the second magnetic pole 32. The fourth magnetic layer 24 is provided between the third magnetic layer 23 and the second magnetic pole 32.

The magnetic element 20 includes a first non-magnetic layer 41, a second non-magnetic layer 42, a third non-magnetic layer 43, a fourth non-magnetic layer 44 and a fifth non-magnetic layer 45. The first non-magnetic layer 41 is provided between the first magnetic pole 31 and the first magnetic layer 21. The second non-magnetic layer 42 is provided between the first magnetic layer 21 and the second magnetic layer 22. The third non-magnetic layer 43 is provided between the second magnetic layer 22 and the third magnetic layer 23. The fourth non-magnetic layer 44 is provided between the third magnetic layer 23 and the fourth magnetic layer 24. The fifth non-magnetic layer 45 is provided between the fourth magnetic layer 24 and the second magnetic pole 32.

As shown in FIG. 3, in the magnetic head 110, the first magnetic layer 21 and the third magnetic layer 23 are thicker than the second magnetic layer 22 and the fourth magnetic layer 24.

As already described, the direction from the first magnetic pole 31 to the second magnetic pole 32 is the first direction D1. A thickness of the first magnetic layer 21 along the first direction D1 is defined as a first thickness t21. A thickness of the second magnetic layer 22 along the first direction D1 is defined as a second thickness t22. A thickness of the third magnetic layer 23 along the first direction D1 is defined as a third thickness t23. A thickness of the fourth magnetic layer 24 along the first direction D1 is defined as a fourth thickness t24.

In the magnetic head 110, the first thickness t21 is thicker than the second thickness t22. The first thickness t21 is thicker than the fourth thickness t24. The third thickness t23 is thicker than the second thickness t22. The third thickness t23 is thicker than the fourth thickness t24.

An example of the characteristics of the magnetic head 110 will be described below.

Figure 4A:
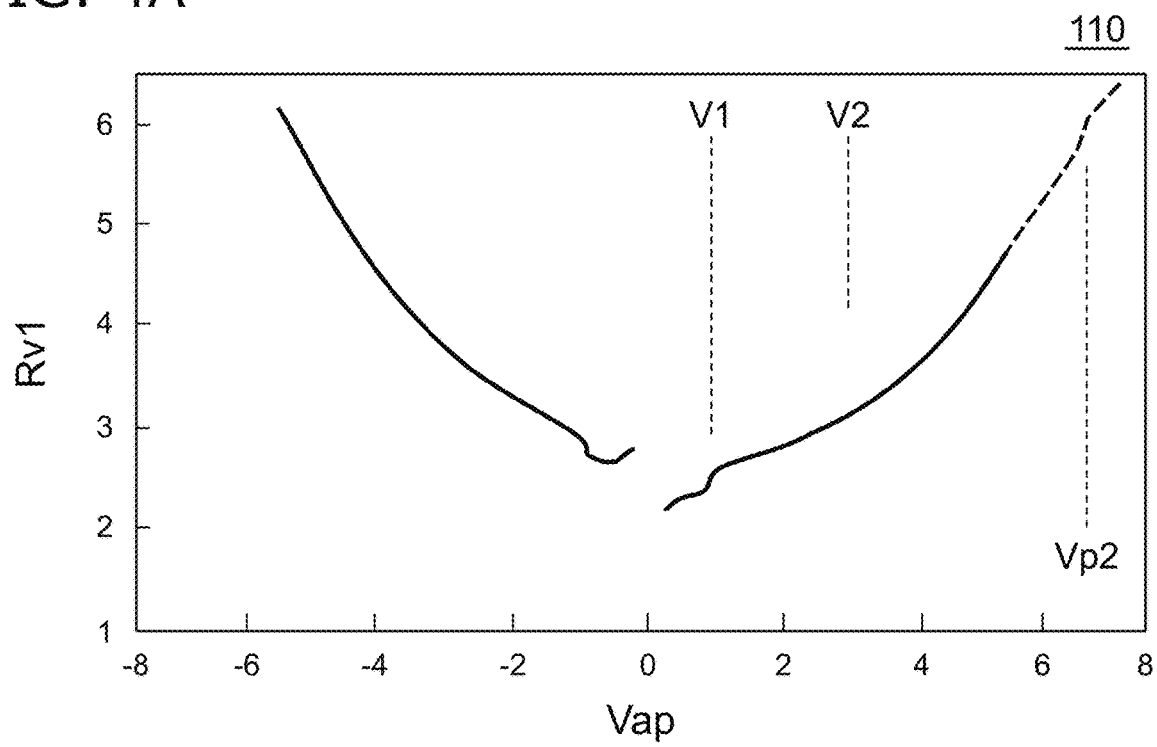
FIGS. 4A and 4B are graphs illustrating the characteristics of the magnetic recording device according to the first embodiment.
Figure 4B:
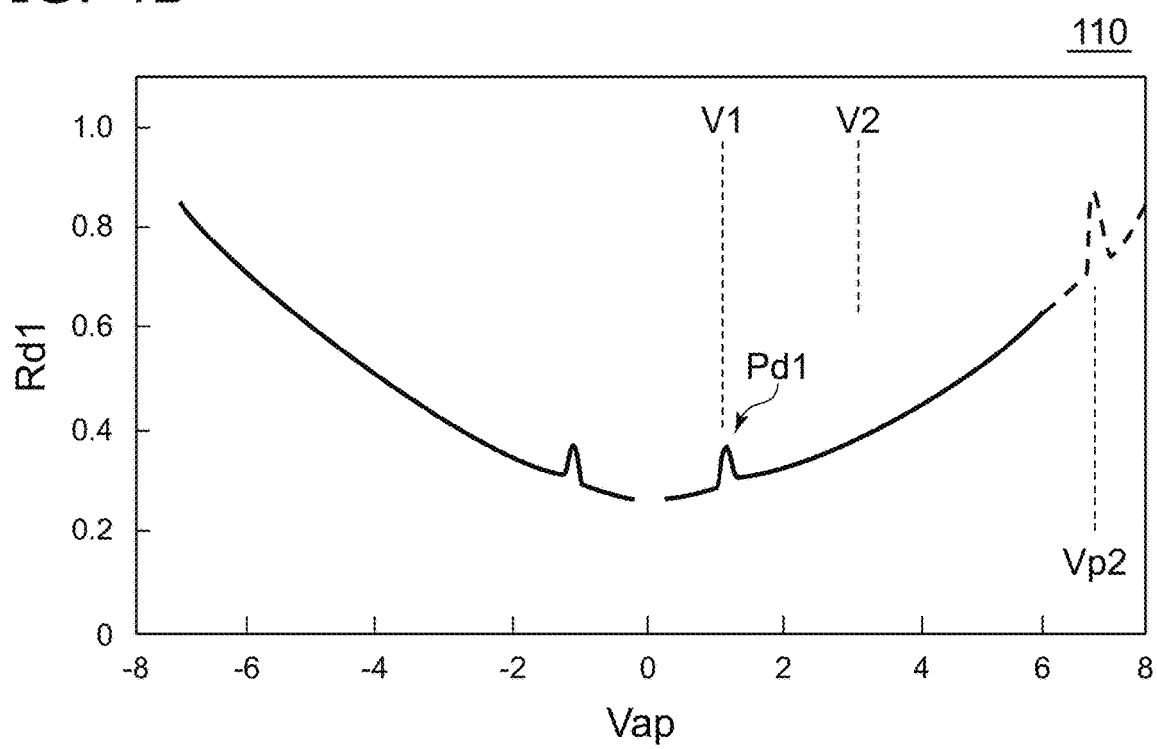

FIGS. 4A and 4B are graphs illustrating the characteristics of the magnetic recording device according to the first embodiment.

The horizontal axis of these figures is the applied voltage Vap. The applied voltage Vap is a voltage applied between the first terminal T1 and the second terminal T2 while the recording current Iw is being supplied to the coil 30c. The second potential of the second magnetic pole 32 is lower than the first potential of the first magnetic pole 31 when the positive applied voltage Vap is applied.

The vertical axis of FIG. 4A is an electrical resistance Rv1 of the magnetic element 20. The electrical resistance Rv1 corresponds to the electrical resistance between the first terminal T1 and the second terminal T2. The vertical axis of FIG. 4B is the differential resistance Rd1.

As shown in FIG. 4A, when the applied voltage Vap is positive and the applied voltage Vap increases, the electrical resistance Rv1 increases. The increase in the electrical resistance Rv1 includes thermal effects due to applied voltage Vap. When the applied voltage Vap is the first voltage V1, the electrical resistance Rv1 changes discontinuously.

As shown in FIG. 4B, when the applied voltage Vap is the first voltage V1, the differential resistance Rd1 has a first peak Pd1. The first peak Pd1 corresponds to the discontinuous change in the electrical resistance Rv1.

As will be described below, the discontinuous change in the electrical resistance Rv1 at the first voltage V1 and the first peak Pd1 are considered to be due to the magnetization reversal of the magnetic layer included in the magnetic element 20.

As described above, when the applied voltage Vap being positive applied between the first terminal T1 and the second terminal T2 is changed while the recording current Iw is supplied to the coil 30c, the differential resistance Rd1 of the magnetic element 20 becomes the first peak Pd1 when the applied voltage Vap is the first voltage V1.

As shown in FIG. 4A, when the applied voltage Vap is negative and the absolute value of the applied voltage Vap is increased, a voltage may exist in which the electrical resistance Rv1 changes discontinuously. As shown in FIG. 4B, a voltage may exist at which the differential resistor Rd1 becomes a local peak when the absolute value of the applied voltage Vap is increased when the applied voltage Vap is negative. As shown in FIG. 4B, the local peak (broken line) may exist in the differential resistance Rd1 when the applied voltage Vap is positive and the applied voltage Vap is excessively high (a voltage Vp2 exceeding the second voltage V2).

It is considered that the magnetization of the magnetic layer included in the magnetic element 20 is reversed and the alternating magnetic field is generated from the magnetic element 20 at a voltage higher than or equal to the first voltage V1 which is shown in FIG. 4B.

In the embodiment, it has been found that an electrical signal is observed between the first terminal T1 and the second terminal T2 when the voltage is applied between the first terminal T1 and the second terminal T2. This electrical signal is different from direct current. This electrical signal is considered to be related to fluctuations in electrical resistance occurring in the magnetic element 20. This electrical signal is considered to be related to fluctuations in the magnetization of the magnetic layer included in the magnetic element 20, for example. It is considered that a noise that generally appears during electrical measurement is included in the electrical signal. It is considered that a noise due to an influence of heat, for example, is included in the electrical signal.

An example of the above electric signal will be described below.

Figure 5:
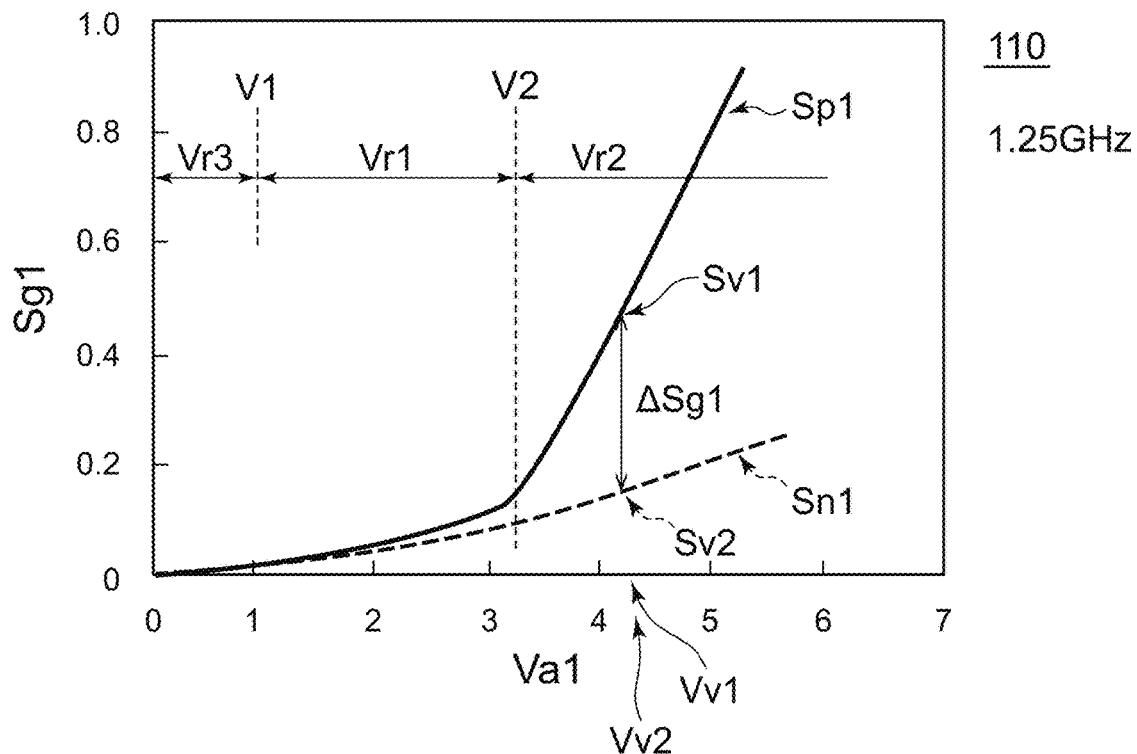
FIG. 5 is a graph illustrating characteristics of the magnetic recording device according to the first embodiment.

FIG. 5 is a graph illustrating characteristics of the magnetic recording device according to the first embodiment.

The horizontal axis of FIG. 5 is the absolute value of the first applied voltage Va1. The horizontal axis of FIG. 5 is shown being normalized. The first applied voltage Va1 is the voltage applied between the first terminal T1 and the second terminal T2 while the recording current Iw is being supplied to the coil 30c. The first applied voltage Va1 may be positive or negative. When the first applied voltage Va1 is positive, the second potential is lower than the first potential. When the first applied voltage Va1 is negative, the second potential is higher than the first potential.

When the first applied voltage Va1 is applied between the first terminal T1 and the second terminal T2 while the recording current Iw is supplied to the coil 30c, a first signal Sg1 is generated between the first terminal T1 and the second terminal T2.

The vertical axis of FIG. 5 is the magnitude of the first signal Sg1. In FIG. 5, an intensity Sp1 of the first signal Sg1 when the first applied voltage Va1 is positive is shown by a solid line. In FIG. 5, an intensity Sn1 of the first signal Sg1 when the first applied voltage Va1 is negative is shown by a broken line. In this example, the first signal Sg1 is a component of 1.25 GHZ.

As shown in FIG. 5, when the first applied voltage Va1 is negative and the absolute value of the first applied voltage Va1 is greater than the first voltage V1, the change rate of the strength Sn1 of the first signal Sg1 with respect to the first applied voltage Va1 is substantially constant. That is, when the first applied voltage Va1 is negative, the strength Sn1 of the first signal Sg1 changes substantially linearly. On the other hand, when the first applied voltage Va1 is positive, the change rate of the intensity Sp1 of the first signal Sg1 with respect to the first applied voltage Va1 is not constant. In this example, the change rate is low in a first voltage range Vr1 where the first applied voltage Va1 is about 3.2 or less. The change rate is high in a second voltage range Vr2 in which the first applied voltage Va1 exceeds about 3.2.

It is considered that such characteristics when the first applied voltage Va1 is positive reflect the state of magnetization of the magnetic layer included in the magnetic element 20. By deriving a difference between the characteristic when the first applied voltage Va1 is positive and the characteristic when the first applied voltage Va1 is negative, the specificity of the characteristic when the first applied voltage Va1 is positive becomes clearer. For example, it is possible to eliminate the influence of noise that commonly appears in electrical measurements.

As shown in FIG. 5, the intensity Sp1 of the first signal Sg1 when the first applied voltage Va1 is a first value Vv1 being positive is defined as a first intensity Sv1. The intensity Sn1 of the first signal Sg1 when the first applied voltage Va1 is a second value Vv2 being negative is defined as a second intensity Sv2. The absolute value of the second value Vv2 is the same as the absolute value of the first value Vv1. A difference between the first intensity Sv1 and the second intensity Sv2 is defined as a difference ΔSg1.

As shown in FIG. 5, when the first applied voltage Va1 becomes the second voltage range Vr2 from the first voltage range Vr1, the difference ΔSg1 rapidly increases.

Figure 6:
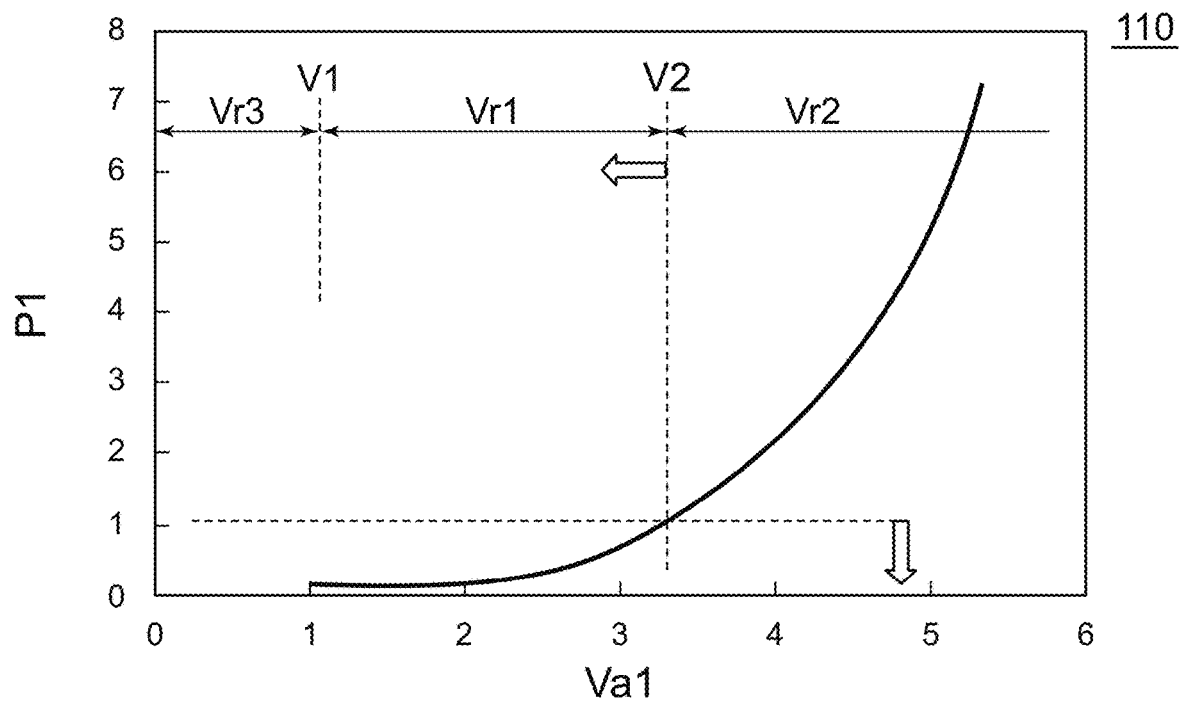
FIG. 6 is a graph illustrating characteristics of the magnetic recording device according to the first embodiment.

FIG. 6 is a graph illustrating characteristics of the magnetic recording device according to the first embodiment.

The horizontal axis of FIG. 6 is the absolute value of the first applied voltage Va1. The horizontal axis of FIG. 6 is shown to be normalized. The vertical axis is a parameter P1. The parameter P1 is a ratio of the absolute value of the difference ΔSg1 between the first intensity Sv1 and the second intensity Sv2 to the normalized change rate. As described above, the first intensity Sv1 is the intensity Sp1 of the first signal Sg1 when the first applied voltage Va1 is the first value Vv1 being positive. The second intensity Sv2 is the intensity Sn1 of the first signal Sg1 when the first applied voltage Va1 is the second value Vv2 being negative. The absolute value of the second value Vv2 is the same as the first value Vv1. The normalized change rate is a product of the first voltage V1 and the absolute value of the change rate of the second intensity Sv2 when the first applied voltage Va1 is negative with respect to the first applied voltage Va1. The change rate of the second intensity Sv2 with respect to the first applied voltage Va1 is calculated in a range where the absolute value of the first applied voltage Va1 is higher than the first voltage V1. The normalized change rate corresponds to the absolute value of the change rate of the second intensity Sv2 with respect to the first applied voltage Va1 normalized by the first voltage V1. The parameter P1 corresponds to a value normalized by the change rate (inclination) of the first signal Sg1 when the first applied voltage Va1 is negative.

As shown in FIG. 6, when the first applied voltage Va1 is not less than 1 and not more than about 3.2 (1 to 3.3 times the first voltage V1), the parameter P1 (ratio) gradually increases with the change of the first applied voltage Va1. The parameter P1 rapidly increases with the change in the first applied voltage Va1 when the first applied voltage Va1 exceeds about 3.2.

As shown in FIG. 6, in the embodiment, the second voltage V2 is set to about 3.2 in FIG. 6. That is, the parameter P1 is 1 or less at the second voltage V2. In the embodiment, the element voltage V 20 is set to such a second voltage V2 or less. Thereby, a stable alternating magnetic field is considered to be obtained. For example, a stable MAMR can be performed. A magnetic recording device capable of improving the recording density can be provided.

For example, in the first voltage range Vr1 in which the first applied voltage Va1 is not less than the first voltage V1 and not more than the second voltage V2 or less, the magnetization of the magnetic layers included in the magnetic element 20 is considered to move stably. For example, synchronous precession is considered to occur stably. In the second voltage range Vr2 exceeding the second voltage V2, it is considered that the magnetization synchronization of the multiple magnetic layers included in the magnetic element 20 is disturbed.

As shown in FIG. 6, the parameter P1 monotonously increases with an increase in the absolute value of the first applied voltage Va1. The absolute value of the difference ΔSg1 (see FIG. 5) monotonously increases as the absolute value of the first applied voltage Va1 increases.

The frequency of the first signal Sg1 is, for example, not less than 10 Hz and not more than 3 GHZ. In the example of FIG. 5, a component of 1.25 GHz is illustrated as the first signal Sg1. At a frequency not less than 10 Hz and not more than 3 GHZ, characteristics with the same tendency as in FIG. 5 is obtained. For example, even if integration is performed in frequency range of not less than 10 Hz and not more than 3 GHZ, characteristics with the same tendency as in FIG. 5 can be obtained.

The first signal Sg1 is obtained, for example, by measuring an electrical signal at the first terminal T1 or the second terminal T2 with a spectrum analyzer. The signal magnitude is measured, for example, in units of dBm. In the measurement, it is preferable not to use frequencies used for information communication (for example, frequencies at which radio waves exist in space). Preferably, AC power frequency (e.g., 50 Hz or 60 Hz) is not used in the measurement. For example, integration in frequency range not less than 10 Hz and not more than 3 GHz can be obtained by adding measured values from the spectrum analyzer, for example. A power meter may measure the integrated value. In the integration, it is preferable to exclude the value of, for example, frequencies used for information communication (for example, frequencies at which radio waves exist in space). The integration preferably excludes the value of the AC power frequency (e.g., 50 Hz or 60 Hz). For example, the measurement can include amplification of the signal.

A frequency of such a first signal Sg1 is defined as a first frequency. As described above, an alternating magnetic field is generated from the magnetic element 20 during the recording operation. A frequency of the alternating magnetic field is defined as a second frequency. The first frequency is lower than the second frequency. The second frequency is, for example, not less than 10 GHz and not more than 50 GHz.

As shown in FIG. 4B, in the magnetic head 110, the differential resistance Rd1 has no peaks other than the first peak Pd1 between the first voltage V1 and the second voltage V2.

An example of simulation results for the magnetic head 110 will be described below.

Figure 7:
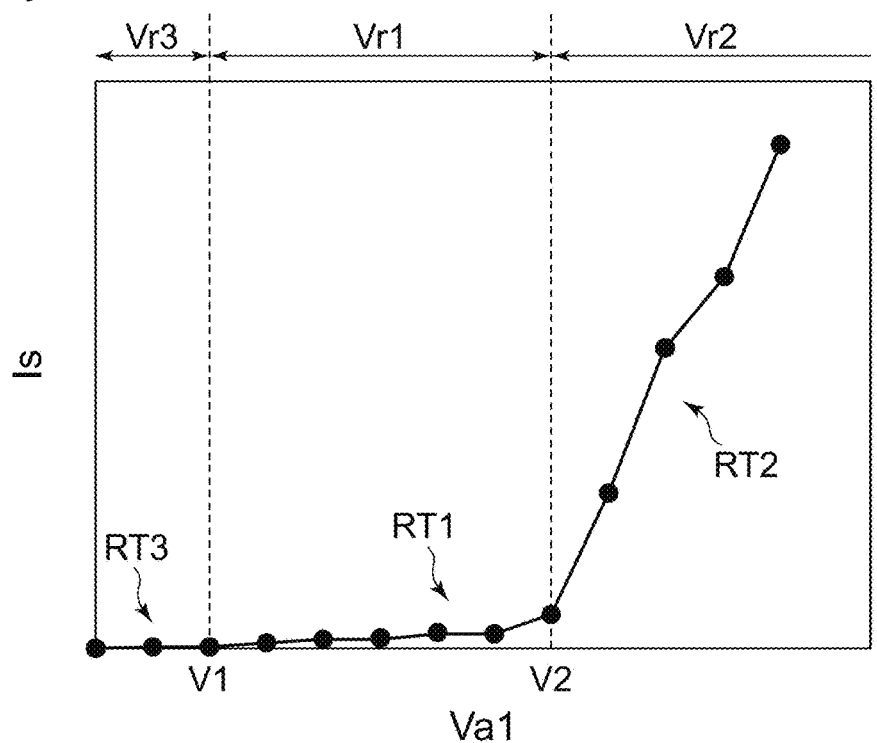
FIG. 7 is a graph illustrating simulation results for a magnetic recording device.

FIG. 7 is a graph illustrating simulation results for a magnetic recording device.

The vertical axis of FIG. 7 is the first applied voltage Va1. The vertical axis is the intensity Is of the first frequency component of the signal generated between the first terminal T1 and the second terminal T2. In this example, the first frequency is 0.2 GHZ.

As shown in FIG. 7, the first applied voltage Va1 includes a first voltage range Vr1, a second voltage range Vr2, and a third voltage range Vr3. The third voltage range Vr3 is lower than the first voltage V1. The first voltage range Vr1 is not less than the first voltage V1 and not more than the second voltage V2. The second voltage range Vr2 exceeds the second voltage V2.

The change rate of the intensity Is with respect to the change of the first applied voltage Va1 is the first change rate RT1 in the first voltage range Vr1. The change rate is the second change rate RT2 in the second voltage range Vr2. The change rate is a third change rate RT3 in the third voltage range Vr3. The first change rate RT1 is lower than the second change rate RT2 and higher than the third change rate RT3.

The simulation result in FIG. 7 corresponds to the intensity Sp1 (solid line) of the first signal Sg1 when the first applied voltage Va1 is positive. The simulation results in FIG. 7 illustrate the effect of magnetization state. The simulation results of FIG. 7 are considered to correspond to the characteristics obtained by removing the effects of heat and the like from the actual measurement results, for example. In FIG. 6 above, it is considered that the influence of heat and the like can be removed by deriving the difference between the characteristics when the first applied voltage Va1 is positive and the characteristics when the first applied voltage Va1 is negative.

Figure 8:
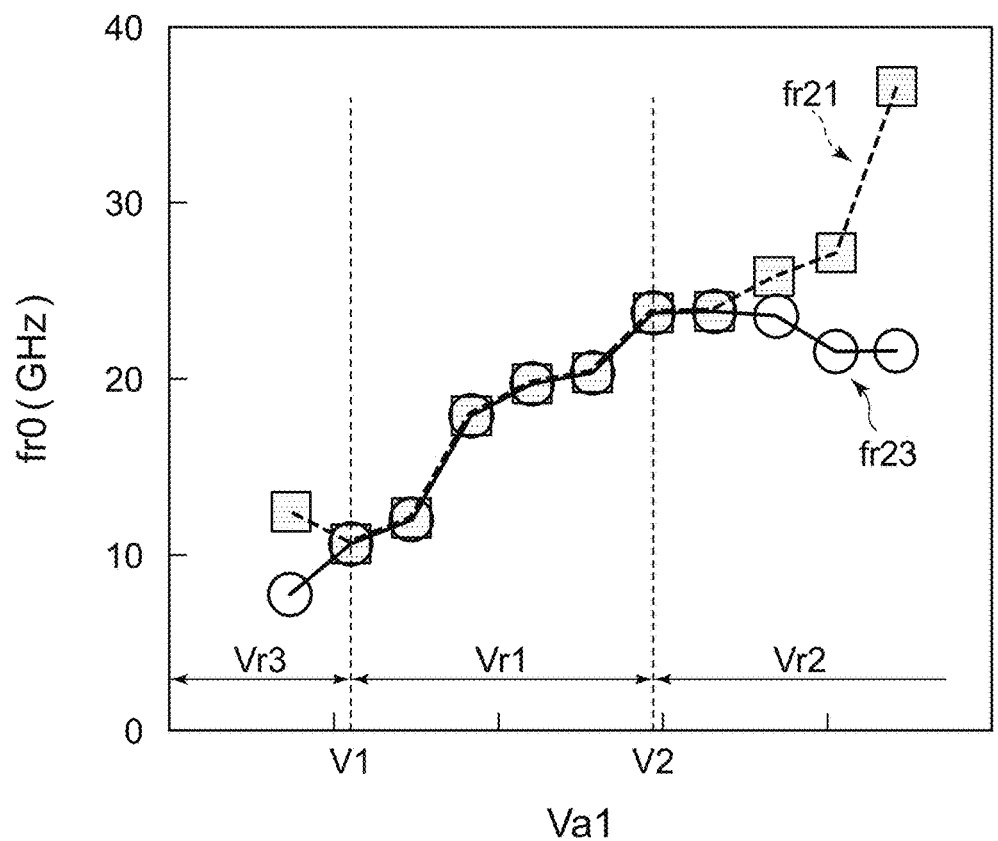
FIG. 8 is a graph illustrating simulation results for a magnetic recording device.

FIG. 8 is a graph illustrating simulation results for a magnetic recording device.

FIG. 8 illustrates simulation results of an oscillation frequency fr21 of the first magnetic layer 21 and an oscillation frequency fr23 of the third magnetic layer 23. The horizontal axis of FIG. 8 is the first applied voltage Va1 being positive. The vertical axis is the oscillation frequency fro of the magnetization of these magnetic layers. The oscillation frequency fro corresponds to the first frequency of the alternating magnetic field.

In the case where the first applied voltage Va1 is lower than the first voltage V1 shown in FIG. 8 (third voltage range Vr3), substantially no oscillation occurs. Oscillation occurs when the first applied voltage Va1 becomes higher than the first voltage V1.

In the case where the first applied voltage Va1 is between the first voltage V1 and the second voltage V2 (first voltage range Vr1), the oscillation frequency fr21 matches the oscillation frequency fr23. This state corresponds to a state in which the magnetization of the first magnetic layer 21 and the magnetization of the third magnetic layer 23 synchronously oscillate in opposite phases.

In the case where the first applied voltage Va1 exceeds the second voltage V2 (second voltage range Vr2), a difference occurs between the oscillation frequency fr21 and the oscillation frequency fr23. In the case where the first applied voltage Va1 exceeds the second voltage V2, in the first magnetic layer 21 and the third magnetic layer 23, oscillations are different from the opposite phases.

In the embodiment, the first voltage V1 is considered to correspond to a threshold voltage (minimum voltage) at which the magnetization oscillates. The second voltage V2 is considered to correspond to the highest voltage at which the multiple magnetizations synchronously and stably oscillate in the opposite phases.

A stable operation is obtained by applying the element voltage V20 in such a range. According to the embodiments, it is possible to provide a magnetic recording device capable of improving the recording density.

In the magnetic head 110, the first magnetic layer 21 and the third magnetic layer 23 are, for example, oscillation layers. The second magnetic layer 22 and the fourth magnetic layer 24 are, for example, spin injection layers.

In the magnetic head 110, for example, the first non-magnetic layer 41 includes at least one selected from the group consisting of Cu, Au, Cr, V, Al and Ag. The second non-magnetic layer 42 includes at least one selected from the group consisting of Ru, Ir, Ta, Rh, Pd, Pt and W. The third non-magnetic layer 43 includes at least one selected from the group consisting of Cu, Au, Cr, V, Al and Ag. The fourth non-magnetic layer 44 includes at least one selected from the group consisting of Cu, Au, Cr, V, Al and Ag. The fifth non-magnetic layer 45 includes at least one selected from the group consisting of Ru, Ir, Ta, Rh, Pd, Pt and W.

In the first material including at least one selected from the group consisting of Ru, Ir, Ta, Rh, Pd, Pt and W, spins are difficult to transmit. In the second material including at least one selected from the group consisting of Cu, Au, Cr, V, Al and Ag, spins are easily transmitted.

The electrical signals obtained in the magnetic head 110 (differential resistance Rd1, first signal Sg1, etc.) are considered to correspond to changes in the state of magnetization of the magnetic layer. Examples of magnetization states will be described below.

FIGS. 9A to 9D are schematic view illustrating the operation of the magnetic recording device according to the first embodiment.

Figure 9A:
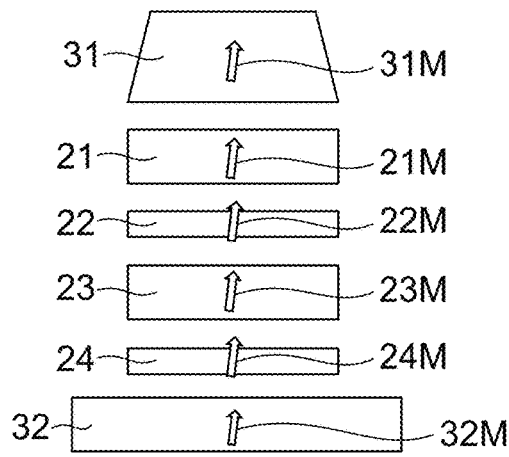
FIGS. 9A to 9D are schematic views illustrating the operation of the magnetic recording device according to the first embodiment.

In a first state ST1 shown in FIG. 9A, the first applied voltage Va1 is in the third voltage range Vr3. As shown in FIG. 9A, in one example, in the first state ST1, the magnetization 31M of the first magnetic pole 31 and the magnetization 32M of the second magnetic pole 32 are "upward". "Upward" corresponds to the orientation from the second magnetic pole 32 to the first magnetic pole 31. In the first state ST1, the magnetization 21M of the first magnetic layer 21, the magnetization 22M of the second magnetic layer 22, the magnetization 23M of the third magnetic layer 23, and the magnetization 24M of the fourth magnetic layer 24 are "upward". "Upward" corresponds to the orientation from the second magnetic pole 32 to the first magnetic pole 31. In the examples of FIGS. 9A to 9D, the orientation (polarity) of the recording current Iw has an orientation corresponds to "upward".

Figure 9B:
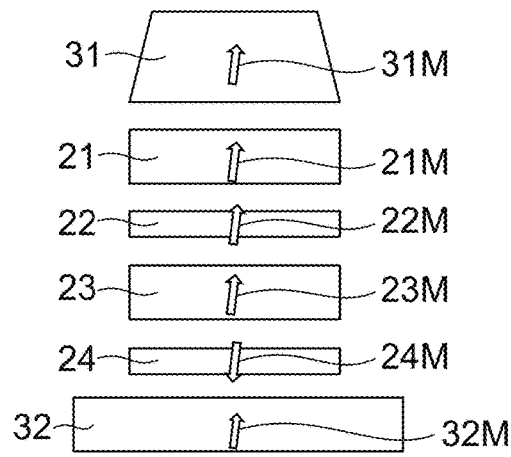

As shown in FIG. 9B, when the first applied voltage Va1 is the first voltage V1, the magnetization 24M of the fourth magnetic layer 24 is reversed.

Figure 9C:
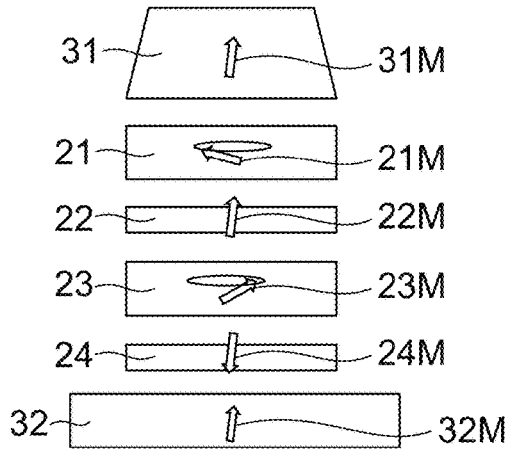

In a second state ST2 shown in FIG. 9C, the first applied voltage Va1 is in the first voltage range Vr1. As shown in FIG. 9C, in the second state ST2, the magnetization 21M of the first magnetic layer 21 and the magnetization 23M of the third magnetic layer 23 oscillate. Thereby, an alternating magnetic field is generated from the magnetic element 20. The magnetization 21M and the magnetization 23M oscillate in opposite phases. For example, the phase difference between the Y-axis direction component of the magnetization 21M and the Y-axis direction component of the magnetization 23M is not less than 160 degrees and not more than 200 degrees. In the second state ST2, a stable oscillation frequency is obtained due to the opposite phase oscillation. An appropriate MAMR can be performed. In the second state ST2, it is considered that the noise signal (first frequency) is small and the change rate of the intensity Is is low due to the opposite phase synchronous oscillation.

Figure 9D:
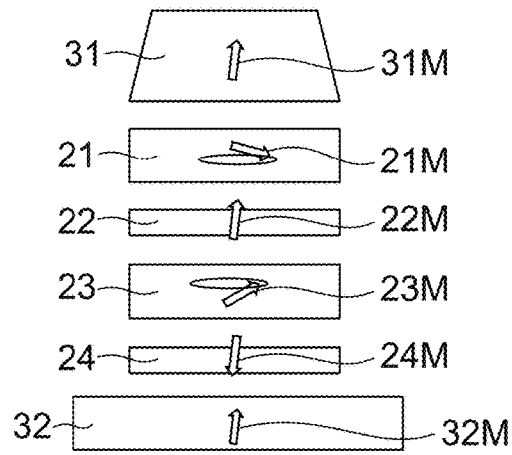

In a third state ST3 shown in FIG. 9D, the first applied voltage Va1 is in the second voltage range Vr2. As shown in FIG. 9D, in the third state ST3, the magnetization 21M of the first magnetic layer 21 and the magnetization 23M of the third magnetic layer 23 oscillate. In the third state ST3, the oscillations in these magnetic layers are out of phase. In the third state ST3, the oscillation in these magnetic layers is different from the opposite phase. For example, the oscillation frequency of the magnetization 21M is different from the oscillation frequency of the magnetization 23M. In the third state ST3, an appropriate MAMR is difficult due to oscillation different from the opposite phase. In the third state ST3, a noise signal (first frequency) corresponding to the difference of multiple oscillations different from the opposite phase is generated, and it is considered that the change rate of the intensity Is is high. For example, the oscillation frequency of the magnetization 21M and the oscillation frequency of the magnetization 23M fluctuate. In the third state ST3, a noise signal (first frequency) is generated by oscillation different from the opposite phase, and it is considered that the change rate of the intensity Is is high.

Second Embodiment

Figure 10:
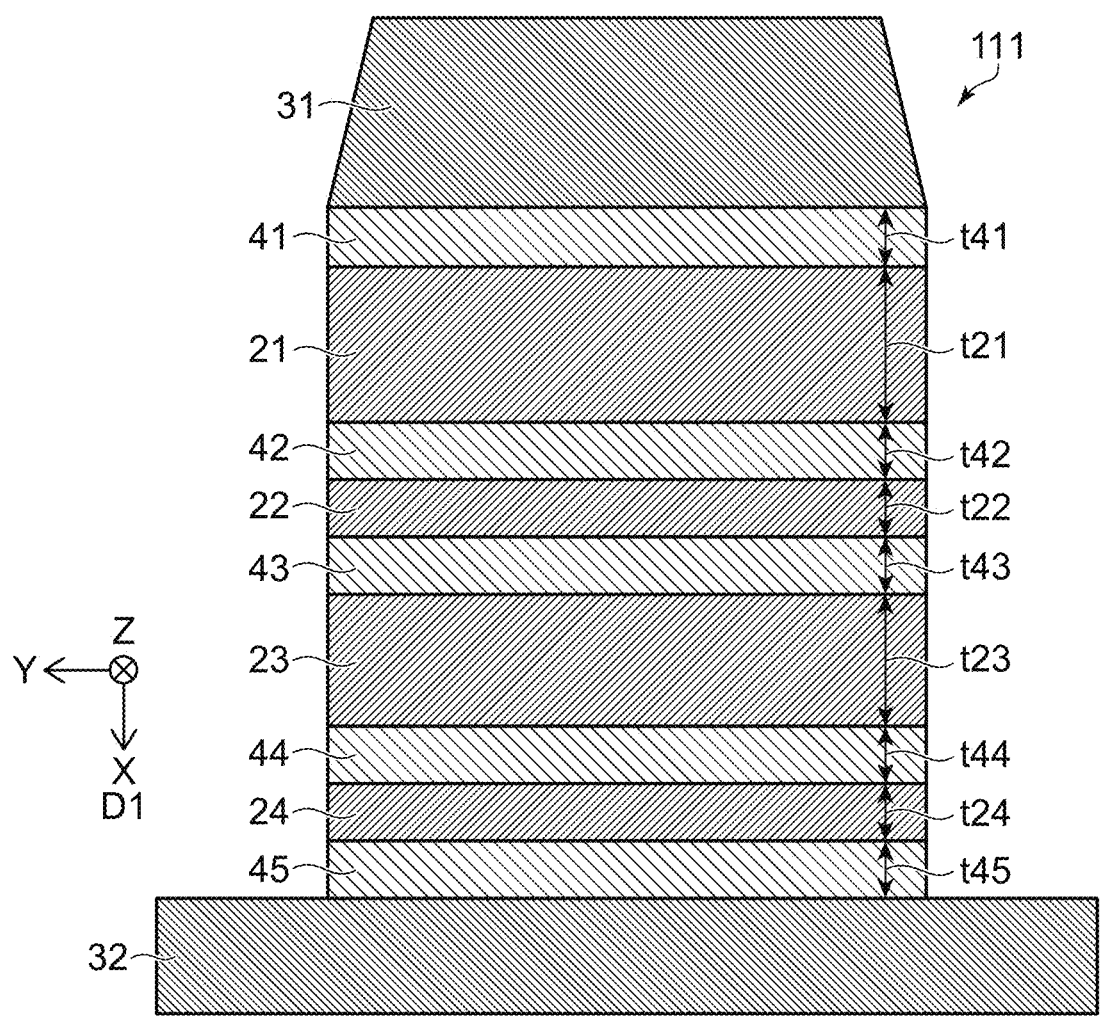
FIG. 10 is a schematic plan view illustrating a part of a magnetic recording device according to a second embodiment.

FIG. 10 is a schematic plan view illustrating a part of a magnetic recording device according to a second embodiment.

As shown in FIG. 10, the configuration of a magnetic head 111 according to the second embodiment differs from the configuration of the magnetic head 110 described above.

Also in the magnetic head 111, the magnetic element 20 includes the first magnetic layer 21, the second magnetic layer 22, the third magnetic layer 23 and the fourth magnetic layer 24. The first magnetic layer 21 is provided between the first magnetic pole 31 and the second magnetic pole 32. The second magnetic layer 22 is provided between the first magnetic layer 21 and the second magnetic pole 32. The third magnetic layer 23 is provided between the second magnetic layer 22 and the second magnetic pole 32. The fourth magnetic layer 24 is provided between the third magnetic layer 23 and the second magnetic pole 32.

In the magnetic head 111, the first thickness t21 of the first magnetic layer 21 along the first direction D1 from the first magnetic pole 31 to the second magnetic pole 32 is thicker than the second thickness t22 of the second magnetic layer 22 along the first direction D1 and thicker than the fourth thickness t24 of the fourth magnetic layer 24 along the first direction D1. The third thickness t23 of the third magnetic layer 23 along the first direction D1 is thicker than the second thickness t22 and thicker than the fourth thickness t24.

The configuration of the magnetic recording device according to the second embodiment may be the same as the configuration of the magnetic recording device 210 described above. That is, in the magnetic recording device 210 according to the second embodiment, the controller 75 supplies the recording current Iw to the coil 30c while applying the element voltage V20 not less than the first voltage V1 and not more than the second voltage V2 between the first terminal T1 and the second terminal T2 in the recording operation. When the element voltage V 20, the first voltage V1 and the second voltage V2 are applied, the second potential of the second magnetic pole 32 is lower than the first potential of the first magnetic pole 31.

The electrical resistance characteristics of the magnetic head 111 according to the second embodiment are different from the electrical resistance characteristics of the magnetic head 110.

Figure 11A:
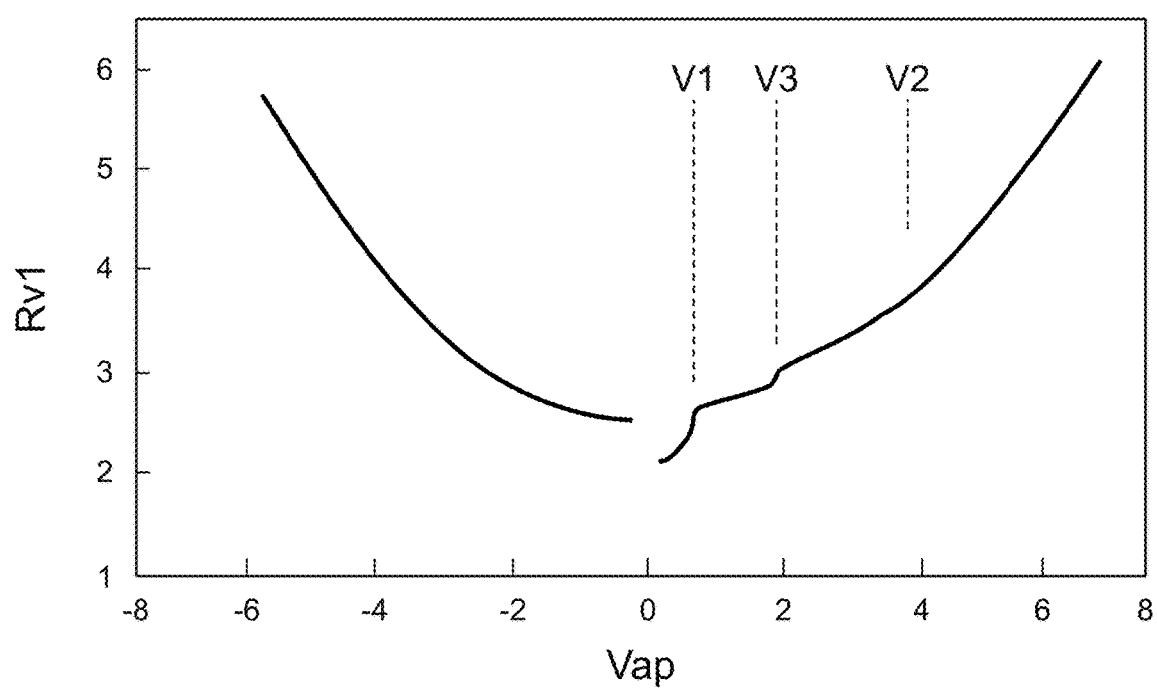
FIGS. 11A and 11B are graphs illustrating characteristics of the magnetic recording device according to the second embodiment.
Figure 11B:
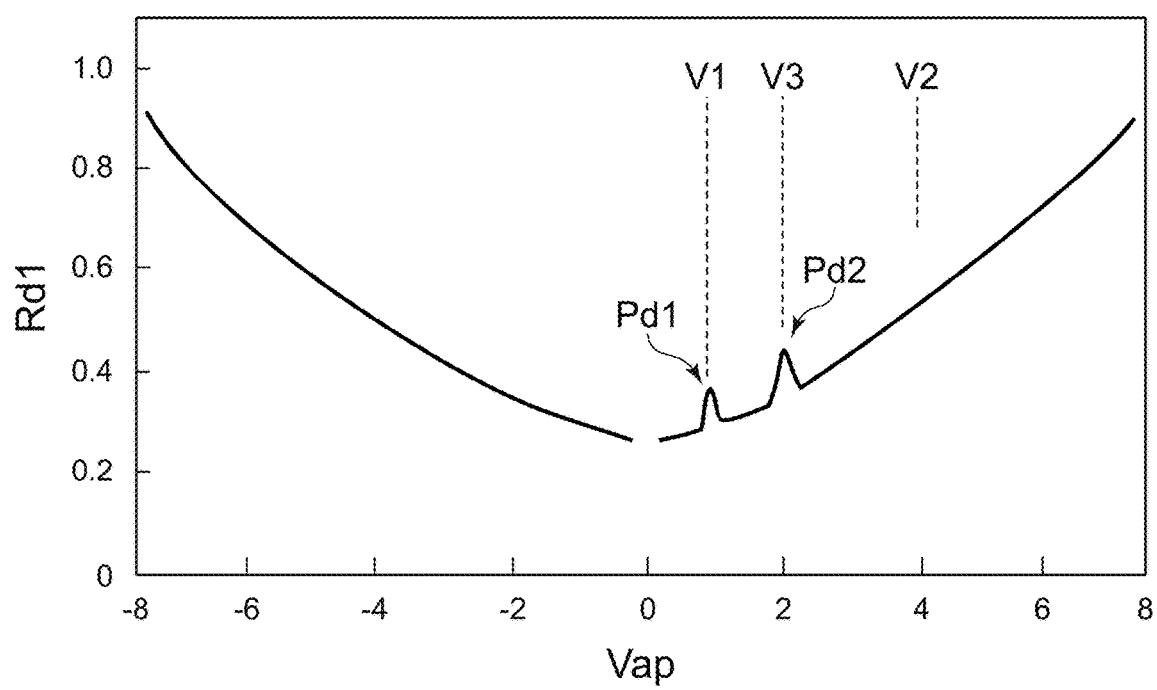

FIGS. 11A and 11B are graphs illustrating characteristics of the magnetic recording device according to the second embodiment.

The horizontal axis of these figures is the applied voltage Vap. The applied voltage Vap is the voltage applied between the first terminal T1 and the second terminal T2 while the recording current Iw is supplied to the coil 30c. The second potential of the second magnetic pole 32 is lower than the first potential of the first magnetic pole 31 when the positive applied voltage Vap is applied.

The vertical axis of FIG. 11A is the electrical resistance Rv1 of the magnetic element 20. The electrical resistance Rv1 corresponds to the electrical resistance between the first terminal T1 and the second terminal T2. The vertical axis of FIG. 11B is the differential resistance Rd1.

As shown in FIG. 11A, when the applied voltage Vap is positive and the applied voltage Vap increases, the electrical resistance Rv1 increases. The increase in the electrical resistance Rv1 includes thermal effects due to applied voltage Vap. When the applied voltage Vap is the first voltage V1, the electrical resistance Rv1 changes discontinuously. When the applied voltage Vap is the third voltage V3, the electrical resistance Rv1 changes discontinuously.

As shown in FIG. 11B, when the applied voltage Vap is the first voltage V1, the differential resistance Rd1 has the first peak Pd1. The first peak Pd1 corresponds to the discontinuous change in the electrical resistance Rv1. The differential resistance Rd1 shows a second peak Pd2 when the applied voltage Vap being positive is the third voltage V3. The third voltage V3 is higher than the first voltage V1 and lower than the second voltage V2. Also in this case, the second potential of the second terminal T2 is lower than the first potential of the first terminal T1 when the applied voltage Vap being positive is applied.

As shown in FIG. 11B, when the applied voltage Vap is negative and the absolute value of the applied voltage Vap is increased, no voltage may exist at which the differential resistance Rd1 becomes a local peak.

Figure 12:
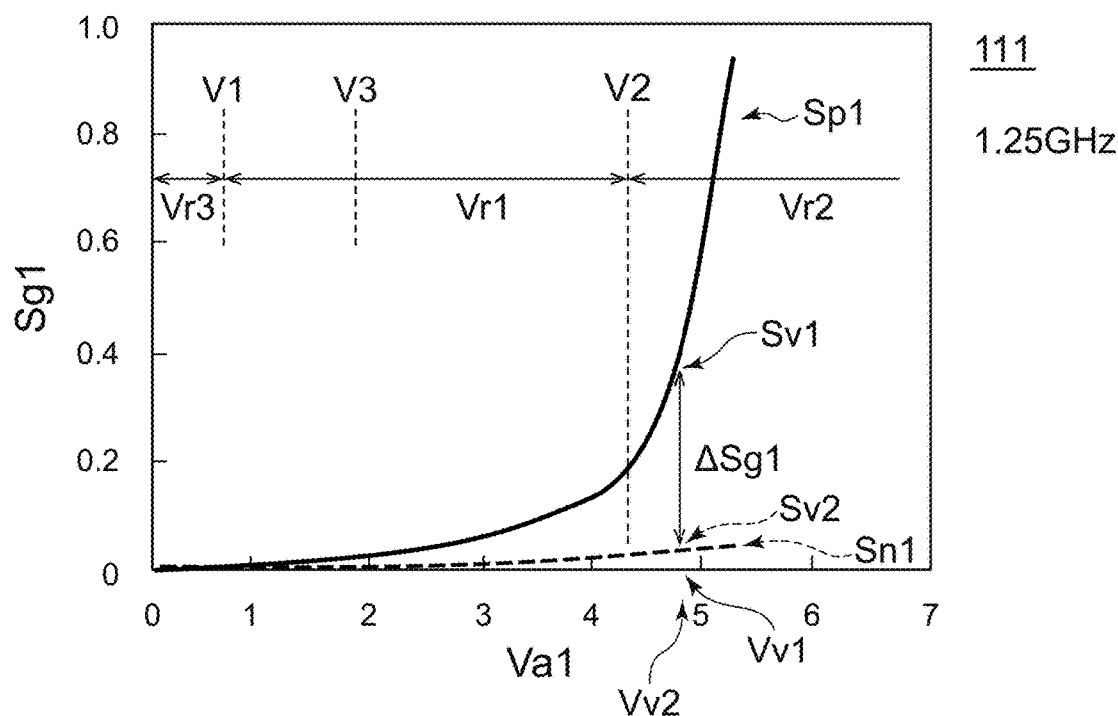
FIG. 12 is a graph illustrating characteristics of the magnetic recording device according to the second embodiment.

FIG. 12 is a graph illustrating characteristics of the magnetic recording device according to the second embodiment.

The horizontal axis of FIG. 12 is the absolute value of the first applied voltage Va1. The horizontal axis of FIG. 12 is shown being normalized. The first applied voltage Va1 is the voltage applied between the first terminal T1 and the second terminal T2 while the recording current Iw is supplied to the coil 30c. The first applied voltage Va1 may be positive or negative. The second potential is lower than the first potential when the first applied voltage Va1 is positive. The second potential is higher than the first potential when the first applied voltage Va1 is negative.

When the recording current Iw is supplied to the coil 30c and the first applied voltage Va1 is applied between the first terminal T1 and the second terminal T2, the first signal Sg1 is generated between the first terminal T1 and the second terminal T2.

The vertical axis of FIG. 12 is the magnitude of the first signal Sg1. In FIG. 12, the strength Sp1 of the first signal Sg1 when the first applied voltage Va1 is positive is shown by a solid line. In FIG. 12, the strength Sn1 of the first signal Sg1 when the first applied voltage Va1 is negative is shown by a broken line. In this example, the first signal Sg1 is a component of 1.25 GHz.

As shown in FIG. 12, when the first applied voltage Va1 is negative, the change rate of the intensity Sn1 of the first signal Sg1 with respect to the first applied voltage Va1 is substantially constant. That is, when the first applied voltage Va1 is negative, the intensity Sn1 of the first signal Sg1 changes substantially linearly. On the other hand, when the first applied voltage Va1 is positive, the change rate of the intensity Sp1 of the first signal Sg1 with respect to the first applied voltage Va1 is not constant. In this example, the change rate is low in the first voltage range Vr1 where the first applied voltage Va1 is about 4.4 or less. The change rate is high in the second voltage range Vr2 where the first applied voltage Va1 exceeds approximately 4.4.

Figure 13:
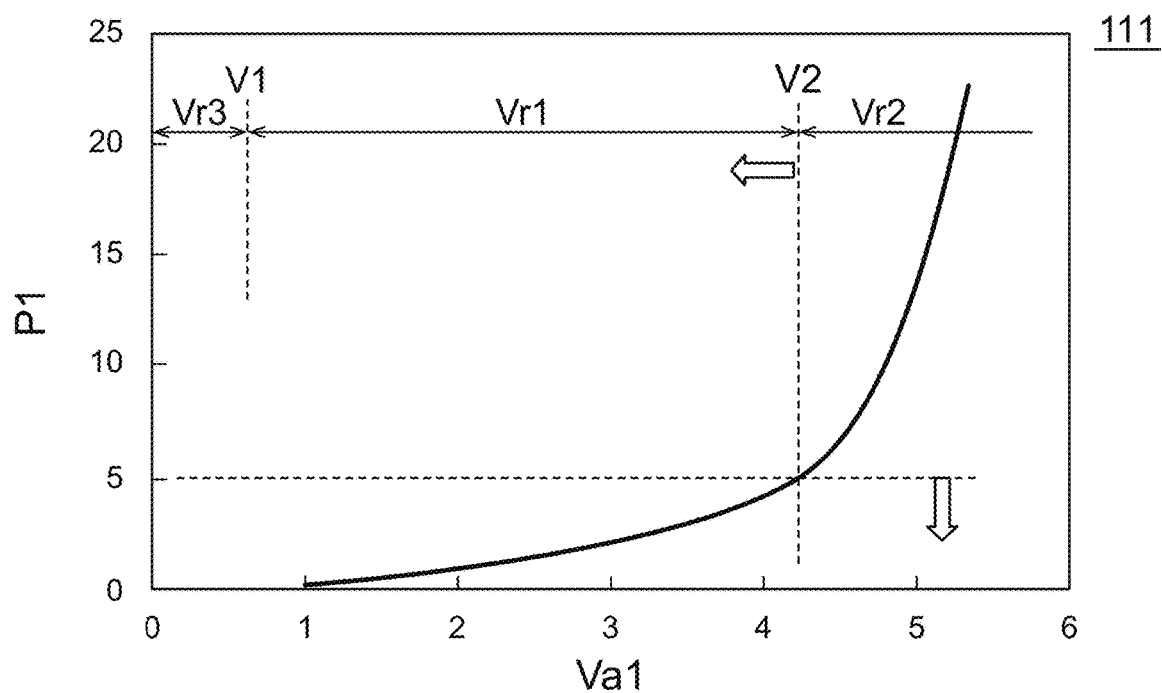
FIG. 13 is a graph illustrating characteristics of the magnetic recording device according to the second embodiment.

FIG. 13 is a graph illustrating characteristics of the magnetic recording device according to the second embodiment.

The horizontal axis of FIG. 13 is the absolute value of the first applied voltage Va1. The horizontal axis of FIG. 13 is shown to be normalized. The vertical axis is the parameter P1. The parameter P1 is a ratio of the absolute value of the difference ΔSg1 between the first intensity Sv1 and the second intensity Sv2 to the normalized change rate. As described above, the first intensity Sv1 is the intensity Sp1 of the first signal Sg1 when the first applied voltage Va1 is the first value Vv1 being positive. The second intensity Sv2 is the intensity Sn1 of the first signal Sg1 when the first applied voltage Va1 is the second value Vv2 being negative. The absolute value of the second value Vv2 is the same as the first value Vv1. The normalized change rate is the product of the first voltage V1 and the absolute value of the change rate of the second intensity Sv2 when the first applied voltage Va1 is negative with respect to the first applied voltage Va1. The change rate of the second intensity Sv2 with respect to the first applied voltage Va1 is calculated in a region where the absolute value of the first applied voltage Va1 is higher than the first voltage V1. The normalized change rate corresponds to the absolute value of the change rate of the second intensity Sv2 with respect to the first applied voltage Va1 normalized by the first voltage V1. The parameter P1 corresponds to a value normalized by the change rate (inclination) of the first signal Sg1 when the first applied voltage Va1 is negative.

As shown in FIG. 13, in the case where the first applied voltage Va1 is not less than 1 and not more than about 4.4 (not less than 1 time and not more than about 4.4 times of the first voltage V1), the parameter P1 (ratio) gradually increases with the change in the first applied voltage Va1. When the first applied voltage Va1 exceeds approximately 4.4, the parameter P1 sharply increases with respect to the change in the first applied voltage Va1.

As shown in FIG. 13, in the embodiment, the second voltage V2 is set to approximately 4.4. That is, the parameter P1 is 5 or less at the second voltage V2. In the embodiment, the element voltage V20 is set below such second voltage V2. Thereby, it is considered that a stable alternating magnetic field can be obtained. For example, a stable MAMR can be performed. A magnetic recording device capable of improving the recording density can be provided.

In the magnetic head 111, the absolute value of the difference ΔSg1 monotonously increases as the absolute value of the first applied voltage Va1 increases (see FIG. 12).

In the magnetic head 111, the frequency of the first signal Sg1 is, for example, not less than 10 Hz and not more than 3 GHZ.

In the magnetic head 111, for example, the differential resistance Rd1 has no peaks other than the first peak Pd1 and the second peak Pd2 between the third voltage V3 and the second voltage V2.

In the magnetic head 111 as well, the intensity of the first signal Sg1 changes depending on the voltage range, as in the magnetic head 110 (see FIG. 7). For example, when the first applied voltage Va1 is positive, the intensity of the component at the first frequency of the first signal Sg1 changes according to the change in the first applied voltage Va1. The first frequency is, for example, not less than 10 Hz and not more than 3 GHZ. The first applied voltage Va1 has the first voltage range Vr1 not less than the first voltage V1 and not more than the second voltage V2, the second voltage range Vr2 more than the second voltage V2, and the third voltage range Vr3 less than the first voltage V1 (see FIG. 7). The change rate of the intensity of the first signal Sg1 with respect to the change of the first applied voltage Va1 is the first change rate RT1 in the first voltage range Vr1. The change rate is the second change rate RT2 in the second voltage range Vr2. The change rate is the third change rate RT3 in the third voltage range Vr3.

In the embodiments, the second change rate RT2 is higher than the first change rate RT1. Thereby, a stable MAMR can be performed. In the embodiments, for example, the third change rate RT3 is lower than the first change rate RT1.

In the magnetic head 111, for example, a signal of the second frequency is generated from the magnetic element 20 in the recording operation. The second frequency is, for example, not less than 10 GHZ and not more than 50 GHz.

In the magnetic head 111, the first non-magnetic layer 41 includes at least one selected from the group consisting of Cu, Au, Cr, V, Al and Ag. The second non-magnetic layer 42 includes at least one selected from the group consisting of Cu, Au, Cr, V, Al and Ag. The third non-magnetic layer 43 includes at least one selected from the group consisting of Ru, Ir, Ta, Rh, Pd, Pt and W. The fourth non-magnetic layer 44 includes at least one selected from the group consisting of Cu, Au, Cr, V, Al and Ag. The fifth non-magnetic layer 45 includes at least one selected from the group consisting of Ru, Ir, Ta, Rh, Pd, Pt and W.

Third Embodiment

Figure 14:
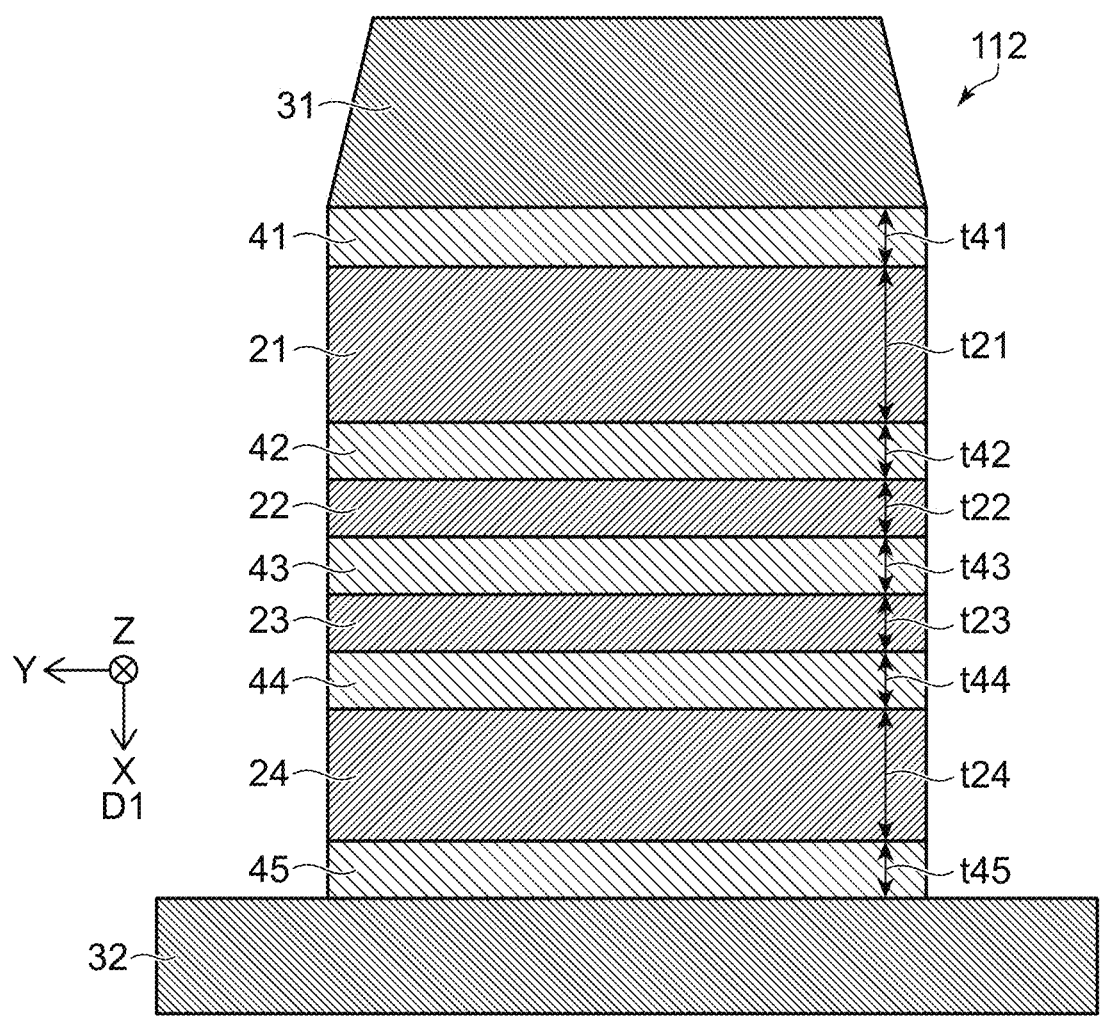
FIG. 14 is a schematic plan view illustrating a part of a magnetic recording device according to a third embodiment.

FIG. 14 is a schematic plan view illustrating a part of a magnetic recording device according to a third embodiment.

As shown in FIG. 14, in a magnetic head 112 according to the embodiment, the magnetic element 20 also includes the first magnetic layer 21, the second magnetic layer 22, the third magnetic layer 23, and the fourth magnetic layer 24. In the magnetic head 112, the first thickness t21 is thicker than the second thickness t22. The first thickness t21 is thicker than the third thickness t23. The fourth thickness t24 is thicker than the second thickness t22. The fourth thickness t24 is thicker than the third thickness t23. In the magnetic head 112, the first magnetic layer 21 and the fourth magnetic layer 24 are, for example, oscillation layers. The second magnetic layer 22 and the third magnetic layer 23 are, for example, spin injection layers.

Also in the magnetic head 112, the magnetic element 20 includes the first non-magnetic layer 41, the second non-magnetic layer 42, the third non-magnetic layer 43, the fourth non-magnetic layer 44 and the fifth non-magnetic layer 45. In the magnetic head 112, the first non-magnetic layer 41 includes at least one selected from the group consisting of Cu, Au, Cr, V, Al and Ag. The second non-magnetic layer 42 includes at least one selected from the group consisting of Cu, Au, Cr, V, Al and Ag. The third non-magnetic layer 43 includes at least one selected from the group consisting of Ru, Ir, Ta, Rh, Pd, Pt and W. The fourth non-magnetic layer 44 includes at least one selected from the group consisting of Cu, Au, Cr, V, Al and Ag. The fifth non-magnetic layer 45 includes at least one selected from the group consisting of Ru, Ir, Ta, Rh, Pd, Pt and W.

In such a magnetic head 112 as well, the element voltage V20 in the recording operation is in the first voltage range Vr1.

In the magnetic head 112, the second change rate RT2 in the second voltage range Vr2 is higher than the first change rate RT1 in the first voltage range Vr1. Thereby, a stable MAMR can be performed. In the magnetic head 112, for example, the third change rate RT3 in the third voltage range Vr3 is lower than the first change rate RT1.

Figure 15:
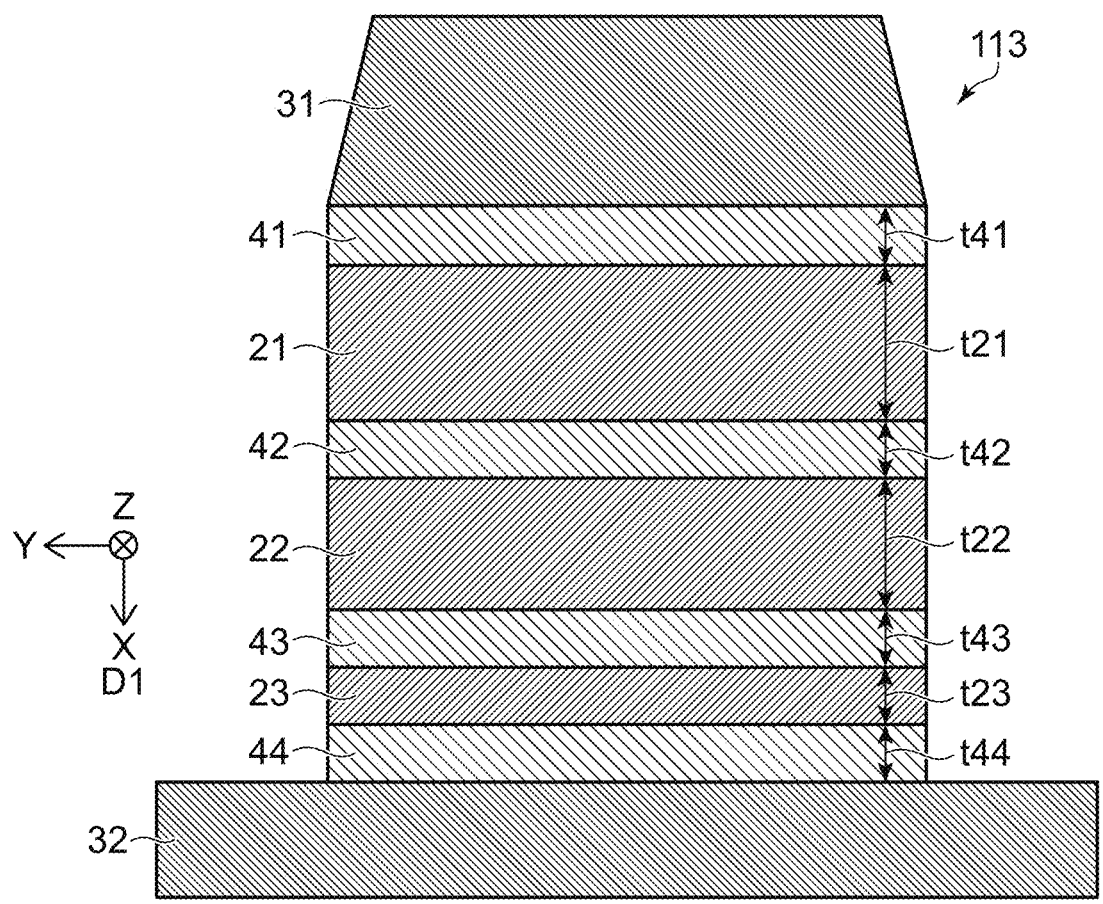
FIG. 15 is a schematic plan view illustrating a part of a magnetic recording device according to the third embodiment.

FIG. 15 is a schematic plan view illustrating a part of a magnetic recording device according to the third embodiment.

As shown in FIG. 15, in a magnetic head 113 according to the embodiment, the magnetic element 20 includes the first magnetic layer 21, the second magnetic layer 22 and the third magnetic layer. The first magnetic layer 21 is provided between the first magnetic pole 31 and the second magnetic pole 32. The second magnetic layer 22 is provided between the first magnetic layer 21 and the second magnetic pole 32. The third magnetic layer 23 is provided between the second magnetic layer 22 and the second magnetic pole 32. The direction from the first magnetic pole 31 to the second magnetic pole 32 is defined as the first direction D1. The first thickness t21 of the first magnetic layer 21 along the first direction D1 is thicker than the third thickness t23 of the third magnetic layer 23 along the first direction D1. The second thickness t22 of the second magnetic layer 22 along the first direction D1 is thicker than the third thickness t23. In the magnetic head 113, the first magnetic layer 21 and the second magnetic layer 22 are, for example, oscillation layers. The third magnetic layer 23 is, for example, a spin injection layer.

In the magnetic head 113, the magnetic element 20 includes the first non-magnetic layer 41, the second non-magnetic layer 42, the third non-magnetic layer 43 and the fourth non-magnetic layer 44. The first non-magnetic layer 41 is provided between the first magnetic pole 31 and the first magnetic layer 21. The second non-magnetic layer 42 is provided between the first magnetic layer 21 and the second magnetic layer 22. The third non-magnetic layer 43 is provided between the second magnetic layer 22 and the third magnetic layer 23. The fourth non-magnetic layer 44 is provided between the third magnetic layer 23 and the second magnetic pole 32.

In the magnetic head 113, the first non-magnetic layer 41 includes at least one selected from the group consisting of Cu, Au, Cr, V, Al and Ag. The second non-magnetic layer 42 includes at least one selected from the group consisting of Ru, Ir, Ta, Rh, Pd, Pt and W. The third non-magnetic layer 43 includes at least one selected from the group consisting of Cu, Au, Cr, V, Al and Ag. The fourth non-magnetic layer 44 includes at least one selected from the group consisting of Ru, Ir, Ta, Rh, Pd, Pt and W.

In such a magnetic head 113 as well, the element voltage V20 in the recording operation is in the first voltage range Vr1.

In the magnetic head 113, the second change rate RT2 in the second voltage range Vr2 is higher than the first change rate RT1 in the first voltage range Vr1. Thereby, a stable MAMR can be performed. In the magnetic head 113, for example, the third change rate RT3 in the third voltage range Vr3 is lower than the first change rate RT1.

In the magnetic heads 110 to 113, the thickness t41 of the first non-magnetic layer 41 is, for example, not less than 5 nm and not more than 15 nm. The thickness t42 of the second non-magnetic layer 42 is, for example, not less than 5 nm and not more than 15 nm. The thickness t43 of the third non-magnetic layer 43 is, for example, not less than 5 nm and not more than 15 nm. The thickness t44 of the fourth non-magnetic layer 44 is, for example, not less than 5 nm and not more than 15 nm. The thickness t45 of the fifth non-magnetic layer 45 is, for example, not less than 5 nm and not more than 15 nm.

Other configuration examples of the magnetic recording device according to the embodiment will be described below.

Figure 16:
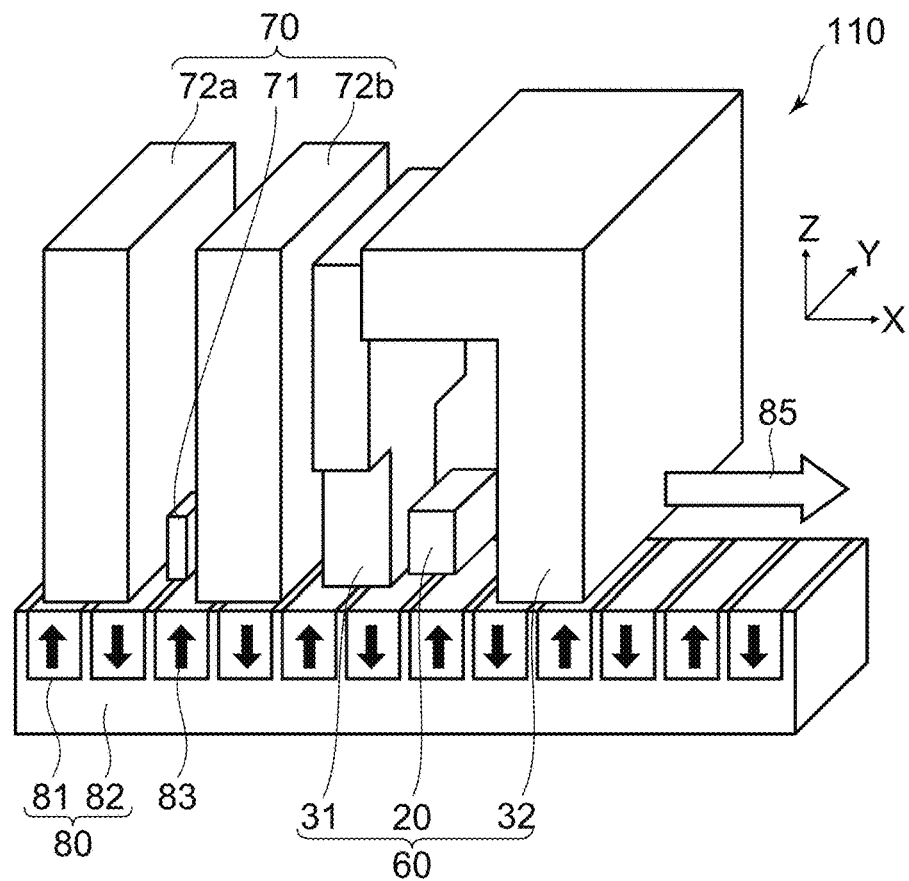
FIG. 16 is a schematic perspective view illustrating the magnetic recording device according to the embodiment.

FIG. 16 is a schematic perspective view illustrating the magnetic recording device according to the embodiment.

As shown in FIG. 16, the magnetic head (for example, the magnetic head 110) according to the embodiment is used together with the magnetic recording medium 80. In this example, the magnetic head 110 includes a recording section 60 and a reproducing section 70. Information is recorded on the magnetic recording medium 80 by the recording section 60 of the magnetic head 110. Information recorded on the magnetic recording medium 80 is reproduced by the reproducing section 70.

The magnetic recording medium 80 includes, for example, a medium substrate 82 and a magnetic recording layer 81 provided on the medium substrate 82. The magnetization 83 of the magnetic recording layer 81 is controlled by the recording section 60.

The reproducing section 70 includes, for example, a first reproducing magnetic shield 72a, a second reproducing magnetic shield 72b, and a magnetic reproducing element 71. The magnetic reproducing element 71 is provided between the first reproducing magnetic shield 72a and the second reproducing magnetic shield 72b. The magnetic reproducing element 71 is configured to output a signal corresponding to the magnetization 83 of the magnetic recording layer 81.

As shown in FIG. 16, the magnetic recording medium 80 moves relative to the magnetic head 110 in a direction of medium movement 85. Information corresponding to the magnetization 83 of the magnetic recording layer 81 is controlled at an arbitrary position by the magnetic head 110. Information corresponding to the magnetization 83 of the magnetic recording layer 81 is reproduced at an arbitrary position by the magnetic head 110.

Figure 17:
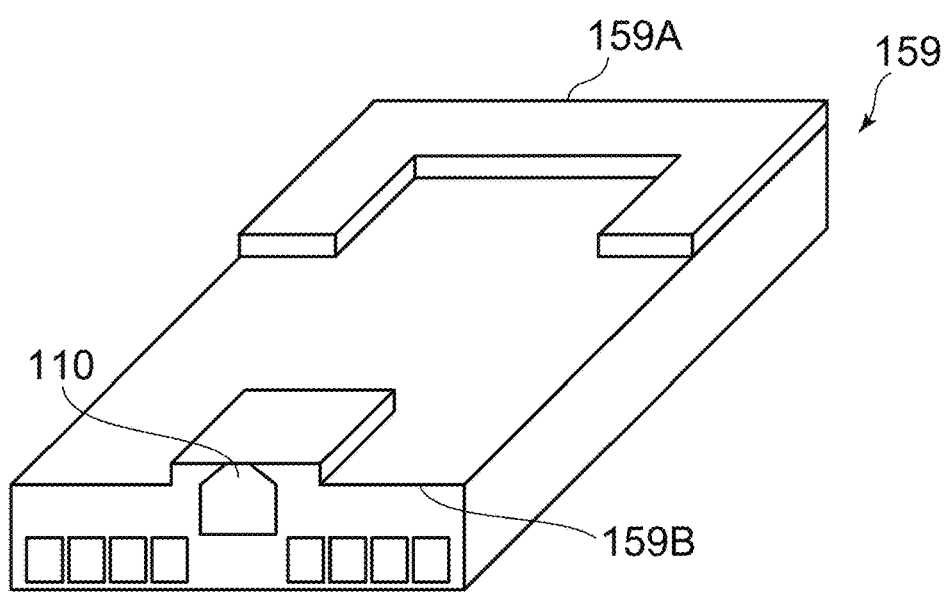
FIG. 17 is a schematic perspective view illustrating a part of the magnetic recording device according to the embodiment.

FIG. 17 is a schematic perspective view illustrating a part of the magnetic recording device according to the embodiment.

FIG. 17 illustrates a head slider.

The magnetic head 110 is provided on the head slider 159. The head slider 159 includes, for example, $Al_2O_3$/TiC or the like. The head slider 159 moves relative to the magnetic recording medium while floating or in contact with the magnetic recording medium.

The head slider 159 includes, for example, an air inflow side 159A and an air outflow side 159B. The magnetic head 110 is arranged on the side surface of the air outflow side 159B of the head slider 159 or the like. As a result, the magnetic head 110 moves relative to the magnetic recording medium while flying above or in contact with the magnetic recording medium.

Figure 18:
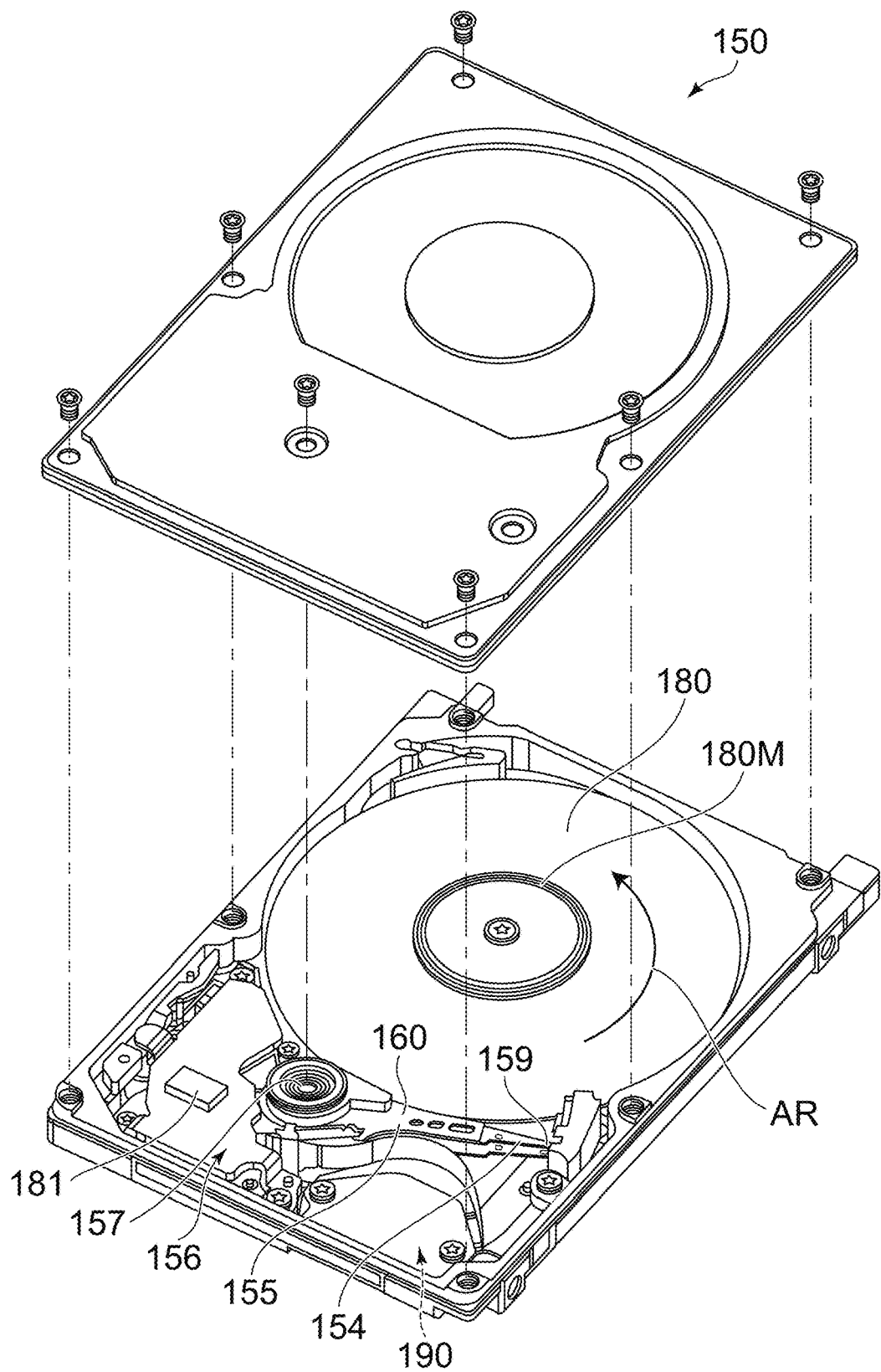
FIG. 18 is a schematic perspective view illustrating the magnetic recording device according to the embodiment.

FIG. 18 is a schematic perspective view illustrating the magnetic recording device according to the embodiment.

Figure 19A:
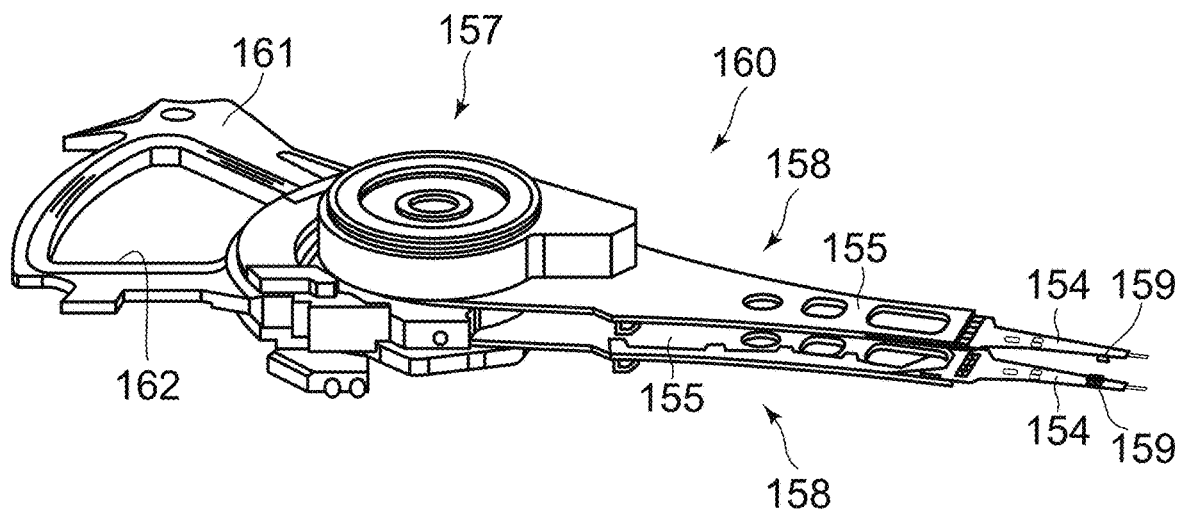
FIGS. 19A and 19B are schematic perspective views illustrating a part of the magnetic recording device according to the embodiment.
Figure 19B:
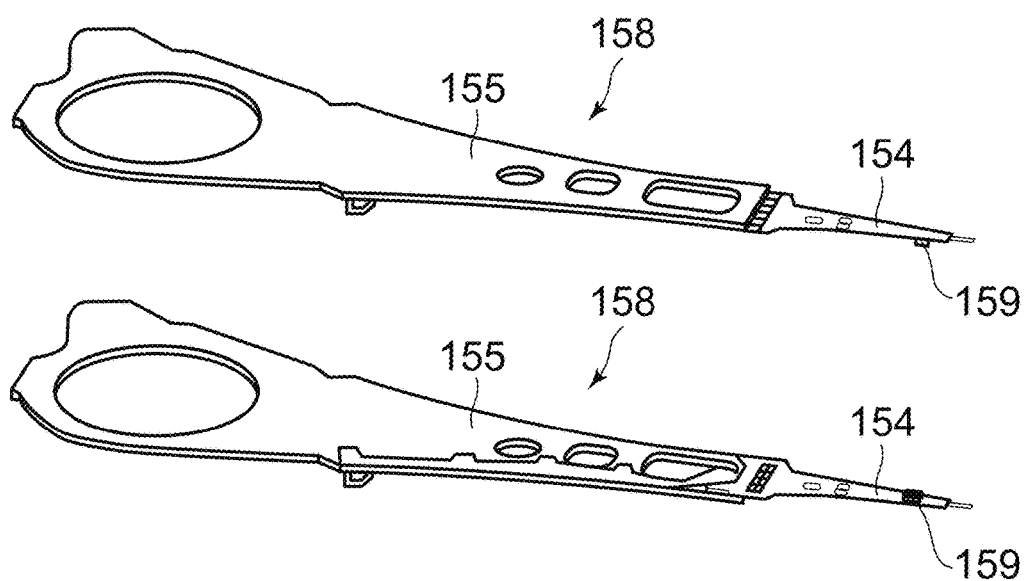

FIGS. 19A and 19B are schematic perspective views illustrating a part of the magnetic recording device according to the embodiment.

As shown in FIG. 18, in a magnetic recording device 150 according to the embodiment, a rotary actuator is used. The recording medium disk 180 is connected to a spindle motor 180M. The recording medium disk 180 is rotated in a direction of arrow AR by the spindle motor 180M. The spindle motor 180M is responsive to control signals from the drive device controller. The magnetic recording device 150 according to the embodiment may include the multiple recording medium disks 180. The magnetic recording device 150 may include a recording medium 181. The recording medium 181 is, for example, an SSD (Solid State Drive). A non-volatile memory such as a flash memory is used for the recording medium 181, for example. For example, the magnetic recording device 150 may be a hybrid HDD (Hard Disk Drive).

The head slider 159 records and reproduces information to be recorded on the recording medium disk 180. The head slider 159 is provided at an end of a thin-film suspension 154. A magnetic head according to the embodiment is provided near the end of the head slider 159.

While the recording medium disk 180 is rotating, the pressing pressure by the suspension 154 and the floating pressure generated at the medium facing surface (ABS) of the head slider 159 are balanced. The distance between the medium facing surface of the head slider 159 and the surface of the recording medium disk 180 is the predetermined fly height. In the embodiment, the head slider 159 may contact the recording medium disk 180. For example, a contact sliding type may be applied.

The suspension 154 is connected to one end of an arm 155 (e.g., an actuator arm). The arm 155 includes, for example, a bobbin part or the like. The bobbin part holds a drive coil. A voice coil motor 156 is provided at the other end of the arm 155. The voice coil motor 156 is a type of linear motor. The voice coil motor 156 includes, for example, a drive coil and a magnetic circuit. The drive coil is wound on the bobbin part of the arm 155. The magnetic circuit includes permanent magnets and opposing yokes. The drive coil is provided between the permanent magnet and the opposing yoke. The suspension 154 includes one end and the other end. The magnetic head is provided at one end of the suspension 154. The arm 155 is connected to the other end of the suspension 154.

The arm 155 is held by ball bearings. Ball bearings are provided at two locations above and below a bearing part 157. The arm 155 can be rotated and slid by the voice coil motor 156. The magnetic head can move to any position on the recording medium disk 180.

FIG. 19A is an enlarged perspective view of the head stack assembly 160, illustrating the configuration of a part of the magnetic recording device.

FIG. 19B is a perspective view illustrating the magnetic head assembly (head gimbal assembly: HGA) 158 that forms part of the head stack assembly 160. FIG.

As shown in FIG. 19A, the head stack assembly 160 includes the bearing part 157, the magnetic head assembly 158 and a support frame 161. The magnetic head assembly 158 extends from the bearing part 157. The support frame 161 extends from the bearing part 157. A direction in which the support frame 161 extends is opposite to a direction in which the magnetic head assembly 158 extends. The support frame 161 supports a coil 162 of the voice coil motor 156.

As shown in FIG. 19B, the magnetic head assembly 158 includes the arm 155 extending from the bearing part 157 and the suspension 154 extending from the arm 155.

The head slider 159 is provided at the end of the suspension 154. The head slider 159 is provided with the magnetic head according to the embodiment.

The magnetic head assembly 158 (head gimbal assembly) according to the embodiment includes the magnetic head according to the embodiment, the head slider 159 provided with the magnetic head, the suspension 154 and the arm 155. The head slider 159 is provided at one end of the suspension 154. The arm 155 is connected to the other end of the suspension 154.

The suspension 154 may include, for example, a wiring (not shown) for recording and reproducing signals. The suspension 154 may include, for example, a heater wiring (not shown) for adjusting the fly height. The suspension 154 may include a wiring (not shown) for, for example, an oscillator element or the like. These wires may be electrically connected to multiple electrodes provided on the magnetic head.

A signal processor 190 is provided in the magnetic recording device 150. The signal processor 190 uses a magnetic head to record and reproduce signals on a magnetic recording medium. Input/output lines of the signal processor 190 are connected to, for example, electrode pads of the magnetic head assembly 158 and electrically connected to the magnetic head.

The magnetic recording device 150 according to the embodiment includes the magnetic recording medium, the magnetic head according to the embodiment, a movable part, a position controller, and a signal processor. The movable part separates the magnetic recording medium from the magnetic head or makes them relatively movable while they are in contact with each other. The position controller aligns the magnetic head with a predetermined recording position on the magnetic recording medium. The signal processor records and reproduces signals on the magnetic recording medium using the magnetic head.

For example, the recording medium disk 180 is used as the above magnetic recording medium. The movable part includes, for example, the head slider 159. The position controller described above includes, for example, the magnetic head assembly 158.

The embodiments may include the following configurations (for example, technical proposals).

Configuration 1
  A magnetic recording device, comprising:
    a magnetic head including
      a first magnetic pole,
      a second magnetic pole,
      a magnetic element provided between the first magnetic pole and the second magnetic pole,
      a first terminal electrically connected to the first magnetic pole,
      a second terminal electrically connected to the second magnetic pole, and
      a coil; and
    a controller electrically connected to the first terminal, the second terminal, and the coil,
    an end of the magnetic element being electrically connected to the first magnetic pole,
    another end of the magnetic element being electrically connected to the second magnetic pole,
    the controller being configured to perform a recording operation,
    in the recording operation, the controller being configured to supply a recording current to the coil while applying an element voltage not less than a first voltage and not more than a second voltage between the first terminal and the second terminal,
    when the element voltage, the first voltage and the second voltage being applied, a second potential of the second magnetic pole being lower than a first potential of the first magnetic pole,
    a differential resistance of the magnetic element when a positive applied voltage applied between the first terminal and the second terminal being changed while the recording current being supplied to the coil becoming a first peak when the applied voltage being the first voltage,
    when the positive applied voltage being applied, the second potential being lower than the first potential,
    when a first applied voltage being applied between the first terminal and the second terminal while the recording current being supplied to the coil, a first signal being generated between the first terminal and the second terminal,
    the first signal having a first intensity when the first applied voltage being a first value of positive,
    the first signal having a second intensity when the first applied voltage being a second value of negative,
    a ratio of an absolute value of a difference between the first intensity and the second intensity to a normalized change rate being not less than 1 at the second voltage,
    an absolute value of the second value being same as the first value,
    when the first applied voltage being positive, the second potential being lower than the first potential,
    when the first applied voltage being negative, the second potential being higher than the first potential, and
    the normalized change rate being a product of the first voltage and an absolute value of the change rate of the second intensity with respect to the first applied voltage when the first applied voltage being negative.

Configuration 2
  The magnetic recording device according to Configuration 1, wherein
    the differential resistance does not have a peak other than the first peak between the first voltage and the second voltage.

Configuration 3
  The magnetic recording device according to Configuration 1 or 2, wherein
    the absolute value of the difference monotonically increases as an absolute value of the first applied voltage increases.

Configuration 4
  The magnetic recording device according to any one of Configurations 1-3, wherein
    a frequency of the first signal is not less than 10 Hz and not more than 3 GHZ.

Configuration 5
  The magnetic recording device according to any one of Configurations 1-4, wherein
    the magnetic element includes:
      a first magnetic layer provided between the first magnetic pole and the second magnetic pole;
      a second magnetic layer provided between the first magnetic layer and the second magnetic pole;
      a third magnetic layer provided between the second magnetic layer and the second magnetic pole; and
      a fourth magnetic layer provided between the third magnetic layer and the second magnetic pole,
      a first thickness of the first magnetic layer along a first direction from the first magnetic pole to the second magnetic pole is thicker than a second thickness of the second magnetic layer along the first direction and thicker than a fourth thickness of the fourth magnetic layer along the first direction, and
      a third thickness of the third magnetic layer along the first direction is thicker than the second thickness and thicker than the fourth thickness.

Configuration 6
  The magnetic recording device according to Configuration 5, wherein
    the magnetic element includes:
      a first non-magnetic layer provided between the first magnetic pole and the first magnetic layer;
      a second non-magnetic layer provided between the first magnetic layer and the second magnetic layer;
      a third non-magnetic layer provided between the second magnetic layer and the third magnetic layer;
      a fourth non-magnetic layer provided between the third magnetic layer and the fourth magnetic layer; and
      a fifth non-magnetic layer provided between the fourth magnetic layer and the second magnetic pole,
      the first non-magnetic layer includes at least one selected from the group consisting of Cu, Au, Cr, V, Al and Ag,
      the second non-magnetic layer includes at least one selected from the group consisting of Ru, Ir, Ta, Rh, Pd, Pt and W,
      the third non-magnetic layer includes at least one selected from the group consisting of Cu, Au, Cr, V, Al and Ag,
      the fourth non-magnetic layer includes at least one selected from the group consisting of Cu, Au, Cr, V, Al and Ag, and
      the fifth non-magnetic layer includes at least one selected from the group consisting of Ru, Ir, Ta, Rh, Pd, Pt and W.

Configuration 7

The magnetic recording device according to any one of Configurations 1-6, wherein
- when the first applied voltage is positive, the intensity of a component of a first frequency of the first signal changes according to the change in the first applied voltage,
- the first frequency is not less than 10 Hz and not more than 3 GHZ,
- the first applied voltage includes a first voltage range not less than the first voltage and not more than the second voltage, and a second voltage range exceeding the second voltage,
- a change rate of the intensity with respect to the change in the first applied voltage is a first change rate in the first voltage range and a second change rate in the second voltage range, and
- the second change rate is higher than the first change rate.

Configuration 8

The magnetic recording device according to Configuration 7, wherein
- the first applied voltage further includes a third voltage range less than the first voltage,
- the change rate is a third change rate in the third voltage range, and
- the third change rate is lower than the first change rate.

Configuration 9

The magnetic recording device according to any one of Configurations 1-8, wherein
- In the recording operation, a signal of a second frequency is generated from the magnetic element, and
- the second frequency is not less than 10 GHz and not more than 50 GHz.

Configuration 10

A magnetic recording device, comprising:
- a magnetic head including
  - a first magnetic pole,
  - a second magnetic pole,
  - a magnetic element provided between the first magnetic pole and the second magnetic pole,
  - a first terminal electrically connected to the first magnetic pole,
  - a second terminal electrically connected to the second magnetic pole, and
  - a coil; and
- a controller electrically connected to the first terminal, the second terminal, and the coil,
- an end of the magnetic element being electrically connected to the first magnetic pole,
- another end of the magnetic element being electrically connected to the second magnetic pole,
- the controller being configured to perform a recording operation,
- in the recording operation, the controller being configured to supply a recording current to the coil while applying an element voltage not less than a first voltage and not more than a second voltage between the first terminal and the second terminal,
- when the element voltage, the first voltage and the second voltage being applied, a second potential of the second magnetic pole being lower than a first potential of the first magnetic pole,
- a differential resistance of the magnetic element when a positive applied voltage applied between the first terminal and the second terminal being changed while the recording current being supplied to the coil becoming a first peak when the applied voltage being the first voltage,
- the differential resistance becoming a second peak when the positive applied voltage being a third voltage,
- the third voltage being higher than the first voltage and lower than the second voltage,
- when the positive applied voltage being applied, the second potential being lower than the first potential,
- when a first applied voltage being applied between the first terminal and the second terminal while the recording current being supplied to the coil, a first signal being generated between the first terminal and the second terminal,
- the first signal having a first intensity when the first applied voltage being a first value of positive,
- the first signal having a second intensity when the first applied voltage being a second value of negative,
- a ratio of an absolute value of a difference between the first intensity and the second intensity to a normalized change rate being not less than 5 at the second voltage,
- when the first applied voltage being positive, the second potential being lower than the first potential,
- when the first applied voltage being negative, the second potential being higher than the first potential,
- an absolute value of the second value being same as the first value,
- the normalized change rate being a product of the first voltage and an absolute value of the change rate of the second intensity with respect to the first applied voltage when the first applied voltage being negative.

Configuration 11

The magnetic recording device according to Configuration 10, wherein
- the differential resistance does not have a peak other than the first peak and the second peak between the third voltage and the second voltage.

Configuration 12

The magnetic recording device according to Configuration 10 or 11, wherein
- the absolute value of the difference increases monotonically with increasing an absolute value of the first applied voltage.

Configuration 13

The magnetic recording device according to any one of Configurations 10-12, wherein
- a frequency of the first signal is not less than 10 Hz and not more than 3 GHZ.

Configuration 14

The magnetic recording device according to any one of Configurations 10-13, wherein
- the magnetic element includes:
  - a first magnetic layer provided between the first magnetic pole and the second magnetic pole;
  - a second magnetic layer provided between the first magnetic layer and the second magnetic pole;
  - a third magnetic layer provided between the second magnetic layer and the second magnetic pole; and
  - a fourth magnetic layer provided between the third magnetic layer and the second magnetic pole,
- a first thickness of the first magnetic layer along a first direction from the first magnetic pole to the second magnetic pole is thicker than a second thickness of the second magnetic layer along the first direction and thicker than a fourth thickness of the fourth magnetic layer along the first direction, and a third thickness of the third magnetic layer along the first direction is thicker than the second thickness and thicker than the fourth thickness.

Configuration 15

The magnetic recording device according to Configuration 14, wherein
the magnetic element includes:
a first non-magnetic layer provided between the first magnetic pole and the first magnetic layer;
a second non-magnetic layer provided between the first magnetic layer and the second magnetic layer;
a third non-magnetic layer provided between the second magnetic layer and the third magnetic layer;
a fourth non-magnetic layer provided between the third magnetic layer and the fourth magnetic layer; and
a fifth non-magnetic layer provided between the fourth magnetic layer and the second magnetic pole,
the first non-magnetic layer includes at least one selected from the group consisting of Cu, Au, Cr, V, Al and Ag,
the second non-magnetic layer includes at least one selected from the group consisting of Cu, Au, Cr, V, Al and Ag,
the third non-magnetic layer includes at least one selected from the group consisting of Ru, Ir, Ta, Rh, Pd, Pt and W,
the fourth non-magnetic layer includes at least one selected from the group consisting of Cu, Au, Cr, V, Al and Ag, and
the fifth nonmagnetic layer includes at least one selected from the group consisting of Ru, Ir, Ta, Rh, Pd, Pt and W.

Configuration 16

The magnetic recording device according to any one of Configurations 10-15, wherein
when the first applied voltage is positive, an intensity of a component of a first frequency of the first signal changes according to a change in the first applied voltage,
the first frequency is not less than 10 Hz and not more than 3 GHz,
the first applied voltage includes a first voltage range not less than the first voltage and not more than the second voltage, and a second voltage range exceeding the second voltage,
a change rate of the intensity with respect to the change of the first applied voltage is a first change rate in the first voltage range and a second change rate in the second voltage range, and
the second change rate is higher than the first change rate.

Configuration 17

The magnetic recording device according to Configuration 16, wherein
the first applied voltage further includes a third voltage range less than the first voltage,
the change rate is a third change rate in the third voltage range, and
the third change rate is lower than the first change rate.

Configuration 18

The magnetic recording device according to any one of Configurations 10-17, wherein
a signal of a second frequency is generated from the magnetic element in the recording operation, and
the second frequency is not less than 10 GHz and not more than 50 GHZ.

Configuration 19

A magnetic recording device, comprising:
a magnetic head including
a first magnetic pole,
a second magnetic pole,
a magnetic element provided between the first magnetic pole and the second magnetic pole,
a first terminal electrically connected to the first magnetic pole,
a second terminal electrically connected to the second magnetic pole, and
a coil; and
a controller electrically connected to the first terminal, the second terminal, and the coil,
an end of the magnetic element being electrically connected to the first magnetic pole,
another end of the magnetic element being electrically connected to the second magnetic pole,
the controller being configured to perform a recording operation,
in the recording operation, the controller being configured to supply a recording current to the coil while applying an element voltage not less than a first voltage and not more than a second voltage between the first terminal and the second terminal,
when the element voltage, the first voltage and the second voltage being applied, a second potential of the second magnetic pole being lower than a first potential of the first magnetic pole,
a first signal being configured to be generated between the first terminal and the second terminal when a first applied voltage being applied between the first terminal and the second terminal while the recording current being supplied to the coil,
the second potential being lower than the first potential when the first applied voltage being applied,
an intensity of a component of a first frequency of the first signal changing according to a change in the first applied voltage,
the first frequency being not less than 10 Hz and not more than 3 GHZ,
the first applied voltage including a first voltage range not less than the first voltage and not more than the second voltage, a second voltage range exceeding the second voltage, and a third voltage range less than the first voltage,
a change rate of the intensity with respect to the change of the first applied voltage being a first change rate in the first voltage range, a second change rate in the second voltage range, and a third change rate in the third voltage range, and
the second change rate being higher than the first change rate, and the third change rate of change being lower than the first change rate.

Configuration 20

The magnetic recording device according to any one of Configurations 1-19, wherein
the element voltage is a direct current.

According to the embodiments, it is possible to provide a magnetic recording device capable of improving the recording density.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in magnetic heads and magnetic recording devices such as magnetic poles, magnetic elements, magnetic layers, non-magnetic layers, terminals, controllers, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all magnetic recording devices practicable by an appropriate design modification by one skilled in the art based on the magnetic recording devices described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A magnetic recording device, comprising:
   a magnetic head including
      a first magnetic pole,
      a second magnetic pole,
      a magnetic element provided between the first magnetic pole and the second magnetic pole,
      a first terminal electrically connected to the first magnetic pole,
      a second terminal electrically connected to the second magnetic pole, and
      a coil; and
   a controller electrically connected to the first terminal, the second terminal, and the coil,
   an end of the magnetic element being electrically connected to the first magnetic pole,
   another end of the magnetic element being electrically connected to the second magnetic pole,
   the controller being configured to perform a recording operation,
   in the recording operation, the controller being configured to supply a recording current to the coil while applying an element voltage not less than a first voltage and not more than a second voltage between the first terminal and the second terminal,
   when the element voltage, the first voltage and the second voltage being applied, a second potential of the second magnetic pole being lower than a first potential of the first magnetic pole,
   a differential resistance of the magnetic element when a positive applied voltage applied between the first terminal and the second terminal being changed while the recording current being supplied to the coil becoming a first peak when the applied voltage being the first voltage,
   when the positive applied voltage being applied, the second potential being lower than the first potential,
   when a first applied voltage being applied between the first terminal and the second terminal while the recording current being supplied to the coil, a first signal being generated between the first terminal and the second terminal,
   the first signal having a first intensity when the first applied voltage being a first value of positive,
   the first signal having a second intensity when the first applied voltage being a second value of negative,
   a ratio of an absolute value of a difference between the first intensity and the second intensity to a normalized change rate being not less than 1 at the second voltage,
   an absolute value of the second value being same as the first value,
   when the first applied voltage being positive, the second potential being lower than the first potential,
   when the first applied voltage being negative, the second potential being higher than the first potential, and
   the normalized change rate being a product of the first voltage and an absolute value of the change rate of the second intensity with respect to the first applied voltage when the first applied voltage being negative.

2. The magnetic recording device according to claim 1, wherein
   the differential resistance does not have a peak other than the first peak between the first voltage and the second voltage.

3. The magnetic recording device according to claim 1, wherein
   the absolute value of the difference monotonically increases as an absolute value of the first applied voltage increases.

4. The magnetic recording device according to claim 1, wherein
   a frequency of the first signal is not less than 10 Hz and not more than 3 GHZ.

5. The magnetic recording device according to claim 1, wherein
   the magnetic element includes:
   a first magnetic layer provided between the first magnetic pole and the second magnetic pole;
   a second magnetic layer provided between the first magnetic layer and the second magnetic pole;
   a third magnetic layer provided between the second magnetic layer and the second magnetic pole; and
   a fourth magnetic layer provided between the third magnetic layer and the second magnetic pole,
   a first thickness of the first magnetic layer along a first direction from the first magnetic pole to the second magnetic pole is thicker than a second thickness of the second magnetic layer along the first direction and thicker than a fourth thickness of the fourth magnetic layer along the first direction, and
   a third thickness of the third magnetic layer along the first direction is thicker than the second thickness and thicker than the fourth thickness.

6. The magnetic recording device according to claim 5, wherein
   the magnetic element includes:
   a first non-magnetic layer provided between the first magnetic pole and the first magnetic layer;

a second non-magnetic layer provided between the first magnetic layer and the second magnetic layer;
a third non-magnetic layer provided between the second magnetic layer and the third magnetic layer;
a fourth non-magnetic layer provided between the third magnetic layer and the fourth magnetic layer; and
a fifth non-magnetic layer provided between the fourth magnetic layer and the second magnetic pole,
the first non-magnetic layer includes at least one selected from the group consisting of Cu, Au, Cr, V, Al and Ag,
the second non-magnetic layer includes at least one selected from the group consisting of Ru, Ir, Ta, Rh, Pd, Pt and W,
the third non-magnetic layer includes at least one selected from the group consisting of Cu, Au, Cr, V, Al and Ag,
the fourth non-magnetic layer includes at least one selected from the group consisting of Cu, Au, Cr, V, Al and Ag, and
the fifth non-magnetic layer includes at least one selected from the group consisting of Ru, Ir, Ta, Rh, Pd, Pt and W.

7. The magnetic recording device according to claim 1, wherein
when the first applied voltage is positive, the intensity of a component of a first frequency of the first signal changes according to the change in the first applied voltage,
the first frequency is not less than 10 Hz and not more than 3 GHz,
the first applied voltage includes a first voltage range not less than the first voltage and not more than the second voltage, and a second voltage range exceeding the second voltage,
a change rate of the intensity with respect to the change in the first applied voltage is a first change rate in the first voltage range and a second change rate in the second voltage range, and
the second change rate is higher than the first change rate.

8. The magnetic recording device according to claim 7, wherein
the first applied voltage further includes a third voltage range less than the first voltage,
the change rate is a third change rate in the third voltage range, and
the third change rate is lower than the first change rate.

9. The magnetic recording device according to claim 1, wherein
In the recording operation, a signal of a second frequency is generated from the magnetic element, and
the second frequency is not less than 10 GHz and not more than 50 GHZ.

10. A magnetic recording device, comprising:
a magnetic head including
a first magnetic pole,
a second magnetic pole,
a magnetic element provided between the first magnetic pole and the second magnetic pole,
a first terminal electrically connected to the first magnetic pole,
a second terminal electrically connected to the second magnetic pole, and
a coil; and
a controller electrically connected to the first terminal, the second terminal, and the coil,
an end of the magnetic element being electrically connected to the first magnetic pole,
another end of the magnetic element being electrically connected to the second magnetic pole,
the controller being configured to perform a recording operation,
in the recording operation, the controller being configured to supply a recording current to the coil while applying an element voltage not less than a first voltage and not more than a second voltage between the first terminal and the second terminal,
when the element voltage, the first voltage and the second voltage being applied, a second potential of the second magnetic pole being lower than a first potential of the first magnetic pole,
a differential resistance of the magnetic element when a positive applied voltage applied between the first terminal and the second terminal being changed while the recording current being supplied to the coil becoming a first peak when the applied voltage being the first voltage,
the differential resistance becoming a second peak when the positive applied voltage being a third voltage,
the third voltage being higher than the first voltage and lower than the second voltage,
when the positive applied voltage being applied, the second potential being lower than the first potential,
when a first applied voltage being applied between the first terminal and the second terminal while the recording current being supplied to the coil, a first signal being generated between the first terminal and the second terminal,
the first signal having a first intensity when the first applied voltage being a first value of positive,
the first signal having a second intensity when the first applied voltage being a second value of negative,
a ratio of an absolute value of a difference between the first intensity and the second intensity to a normalized change rate being not less than 5 at the second voltage,
when the first applied voltage being positive, the second potential being lower than the first potential,
when the first applied voltage being negative, the second potential being higher than the first potential,
an absolute value of the second value being same as the first value,
the normalized change rate being a product of the first voltage and an absolute value of the change rate of the second intensity with respect to the first applied voltage when the first applied voltage being negative.

11. The magnetic recording device according to claim 10, wherein
the differential resistance does not have a peak other than the first peak and the second peak between the third voltage and the second voltage.

12. The magnetic recording device according to claim 10, wherein
the absolute value of the difference increases monotonically with increasing an absolute value of the first applied voltage.

13. The magnetic recording device according to claim 10, wherein
a frequency of the first signal is not less than 10 Hz and not more than 3 GHZ.

14. The magnetic recording device according to claim 10, wherein
the magnetic element includes:
a first magnetic layer provided between the first magnetic pole and the second magnetic pole;

a second magnetic layer provided between the first magnetic layer and the second magnetic pole;
a third magnetic layer provided between the second magnetic layer and the second magnetic pole; and
a fourth magnetic layer provided between the third magnetic layer and the second magnetic pole,
a first thickness of the first magnetic layer along a first direction from the first magnetic pole to the second magnetic pole is thicker than a second thickness of the second magnetic layer along the first direction and thicker than a fourth thickness of the fourth magnetic layer along the first direction, and
a third thickness of the third magnetic layer along the first direction is thicker than the second thickness and thicker than the fourth thickness.

15. The magnetic recording device according to claim 14, wherein
the magnetic element includes:
a first non-magnetic layer provided between the first magnetic pole and the first magnetic layer;
a second non-magnetic layer provided between the first magnetic layer and the second magnetic layer;
a third non-magnetic layer provided between the second magnetic layer and the third magnetic layer;
a fourth non-magnetic layer provided between the third magnetic layer and the fourth magnetic layer; and
a fifth non-magnetic layer provided between the fourth magnetic layer and the second magnetic pole,
the first non-magnetic layer includes at least one selected from the group consisting of Cu, Au, Cr, V, Al and Ag,
the second non-magnetic layer includes at least one selected from the group consisting of Cu, Au, Cr, V, Al and Ag,
the third non-magnetic layer includes at least one selected from the group consisting of Ru, Ir, Ta, Rh, Pd, Pt and W,
the fourth non-magnetic layer includes at least one selected from the group consisting of Cu, Au, Cr, V, Al and Ag, and
the fifth nonmagnetic layer includes at least one selected from the group consisting of Ru, Ir, Ta, Rh, Pd, Pt and W.

16. The magnetic recording device according to claim 10, wherein
when the first applied voltage is positive, an intensity of a component of a first frequency of the first signal changes according to a change in the first applied voltage,
the first frequency is not less than 10 Hz and not more than 3 GHZ,
the first applied voltage includes a first voltage range not less than the first voltage and not more than the second voltage, and a second voltage range exceeding the second voltage,
a change rate of the intensity with respect to the change of the first applied voltage is a first change rate in the first voltage range and a second change rate in the second voltage range, and
the second change rate is higher than the first change rate.

17. The magnetic recording device according to claim 16, wherein
the first applied voltage further includes a third voltage range less than the first voltage,
the change rate is a third change rate in the third voltage range, and
the third change rate is lower than the first change rate.

18. The magnetic recording device according to claim 10, wherein
a signal of a second frequency is generated from the magnetic element in the recording operation, and
the second frequency is not less than 10 GHz and not more than 50 GHZ.

19. A magnetic recording device, comprising:
a magnetic head including
a first magnetic pole,
a second magnetic pole,
a magnetic element provided between the first magnetic pole and the second magnetic pole,
a first terminal electrically connected to the first magnetic pole,
a second terminal electrically connected to the second magnetic pole, and
a coil; and
a controller electrically connected to the first terminal, the second terminal, and the coil,
an end of the magnetic element being electrically connected to the first magnetic pole,
another end of the magnetic element being electrically connected to the second magnetic pole,
the controller being configured to perform a recording operation,
in the recording operation, the controller being configured to supply a recording current to the coil while applying an element voltage not less than a first voltage and not more than a second voltage between the first terminal and the second terminal,
when the element voltage, the first voltage and the second voltage being applied, a second potential of the second magnetic pole being lower than a first potential of the first magnetic pole,
a first signal being configured to be generated between the first terminal and the second terminal when a first applied voltage being applied between the first terminal and the second terminal while the recording current being supplied to the coil,
the second potential being lower than the first potential when the first applied voltage being applied,
an intensity of a component of a first frequency of the first signal changing according to a change in the first applied voltage,
the first frequency being not less than 10 Hz and not more than 3 GHZ,
the first applied voltage including a first voltage range not less than the first voltage and not more than the second voltage, a second voltage range exceeding the second voltage, and a third voltage range less than the first voltage,
a change rate of the intensity with respect to the change of the first applied voltage being a first change rate in the first voltage range, a second change rate in the second voltage range, and a third change rate in the third voltage range, and
the second change rate being higher than the first change rate, and the third change rate of change being lower than the first change rate.

20. The magnetic recording device according to claim 1, wherein the element voltage is a direct current.

* * * * *